(12) United States Patent
Dutheuil

(10) Patent No.: US 12,528,769 B2
(45) Date of Patent: Jan. 20, 2026

(54) SYNTHESIS OF (2S,5R)-5-(2-CHLOROPHENYL)-1-(2'-METHOXY-[1,1'-BIPHENYL]-4-CARBONYL)PYRROLIDINE-2-CARBOXYLIC ACID

(71) Applicant: EPICS THERAPEUTICS, Gosselies (BE)

(72) Inventor: Guillaume Dutheuil, Vedrin (BE)

(73) Assignee: EPICS THERAPEUTICS, Gosselies (BE)

( * ) Notice: Subject to any disclaimer, the term of this patent is extended or adjusted under 35 U.S.C. 154(b) by 518 days.

(21) Appl. No.: 18/001,539

(22) PCT Filed: Jun. 10, 2021

(86) PCT No.: PCT/EP2021/065629
§ 371 (c)(1),
(2) Date: Dec. 12, 2022

(87) PCT Pub. No.: WO2021/250174
PCT Pub. Date: Dec. 16, 2021

(65) Prior Publication Data
US 2023/0271921 A1    Aug. 31, 2023

(30) Foreign Application Priority Data
Jun. 10, 2020   (EP) .................................... 20179195

(51) Int. Cl.
*C07D 207/16*    (2006.01)
(52) U.S. Cl.
CPC .................................. *C07D 207/16* (2013.01)
(58) Field of Classification Search
CPC ...... C07D 207/16; A61P 29/00; A61K 31/401
See application file for complete search history.

(56) References Cited

U.S. PATENT DOCUMENTS 5,610,144 A    3/1997   Capet et al.

FOREIGN PATENT DOCUMENTS

| WO | 2011073376 A1 | 6/2011 |
|----|---------------|--------|
| WO | 2012034091 A1 | 3/2012 |
| WO | 2015078949 A1 | 6/2015 |
| WO | 2016077841 A1 | 5/2016 |

OTHER PUBLICATIONS

International Search Report issued on Sep. 21, 2021 in corresponding International application No. PCT/EP2021/065629; 6 pages.

Hansen et al., "Discovery of a Potent Thiazolidine Free Fatty Acid Receptor 2 Agonist with Favorable Pharmacokinetic Properties", Journal of Medicinal Chemistry, vol. 61, No. 21, Sep. 24, 2018 , pp. 9534-9550, XP055738959.
Palovics et al., "Separation of Mixtures of Chiral Compounds by Crystallization", Advances in Crystallization Processes, Apr. 1, 2012, pp. 1-38.
Bastin et al., "Salt Selection and Optimisation Procedures for Pharmaceutical New Chemical Entities", Jul. 19, 2000, vol. 4, No. 5, pp. 427-435, XP008154792.

*Primary Examiner* — Rayna Rodriguez
(74) *Attorney, Agent, or Firm* — Maier & Maier, PLLC

(57) ABSTRACT

A process of manufacturing of (2S,5R)-5-(2-chlorophenyl)-1-(2'-methoxy-[1,1'-biphenyl]-4-carbonyl)pyrrolidine-2-carboxylic acid (1), including the preparation of (2S,5R)-methyl 5-(2-chlorophenyl)pyrrolidine-2-carboxylate hydrochloride (6·HCl) as an intermediate of synthesis:

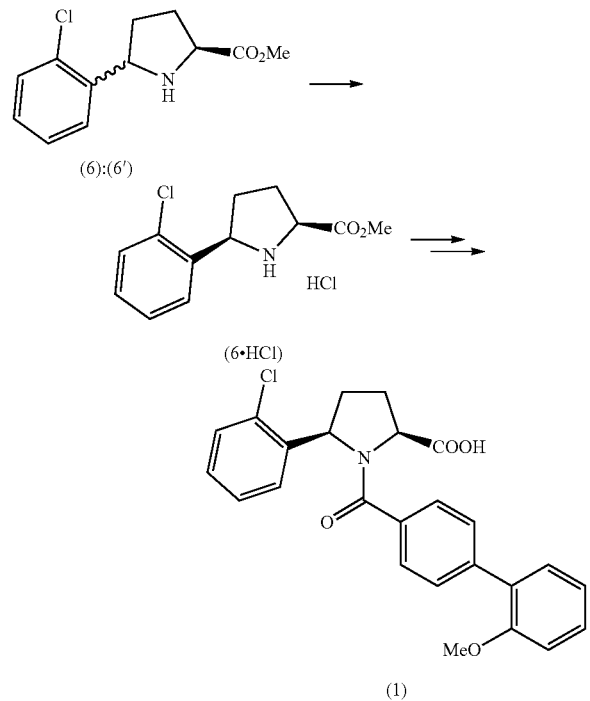

Also, the sodium salt of the (2S,5R)-5-(2-chlorophenyl)-1-(2'-methoxy-[1,1'-biphenyl]-4-carbonyl)pyrrolidine-2-carboxylic acid (1), and its use in a pharmaceutical composition including sodium the (2S,5R)-5-(2-chlorophenyl)-1-(2'-methoxy-[1,1'-biphenyl]-4-carbonyl)pyrrolidine-2-carboxylate and a method for treating and/or preventing inflammation in a patient.

15 Claims, No Drawings

SYNTHESIS OF (2S,5R)-5-(2-CHLOROPHENYL)-1-(2'-METH-OXY-[1,1'-BIPHENYL]-4-CARBONYL)PYR-ROLIDINE-2-CARBOXYLIC ACID

FIELD

The present invention relates to the field of chemical synthesis, and provides a process of manufacturing of (2S,5R)-5-(2-chlorophenyl)-1-(2'-methoxy-[1,1'-biphenyl]-4-carbonyl)pyrrolidine-2-carboxylic acid (1), including the preparation of (2S,5R)-methyl 5-(2-chlorophenyl)pyrrolidine-2-carboxylate hydrochloride (6·HCl) as intermediate of synthesis:

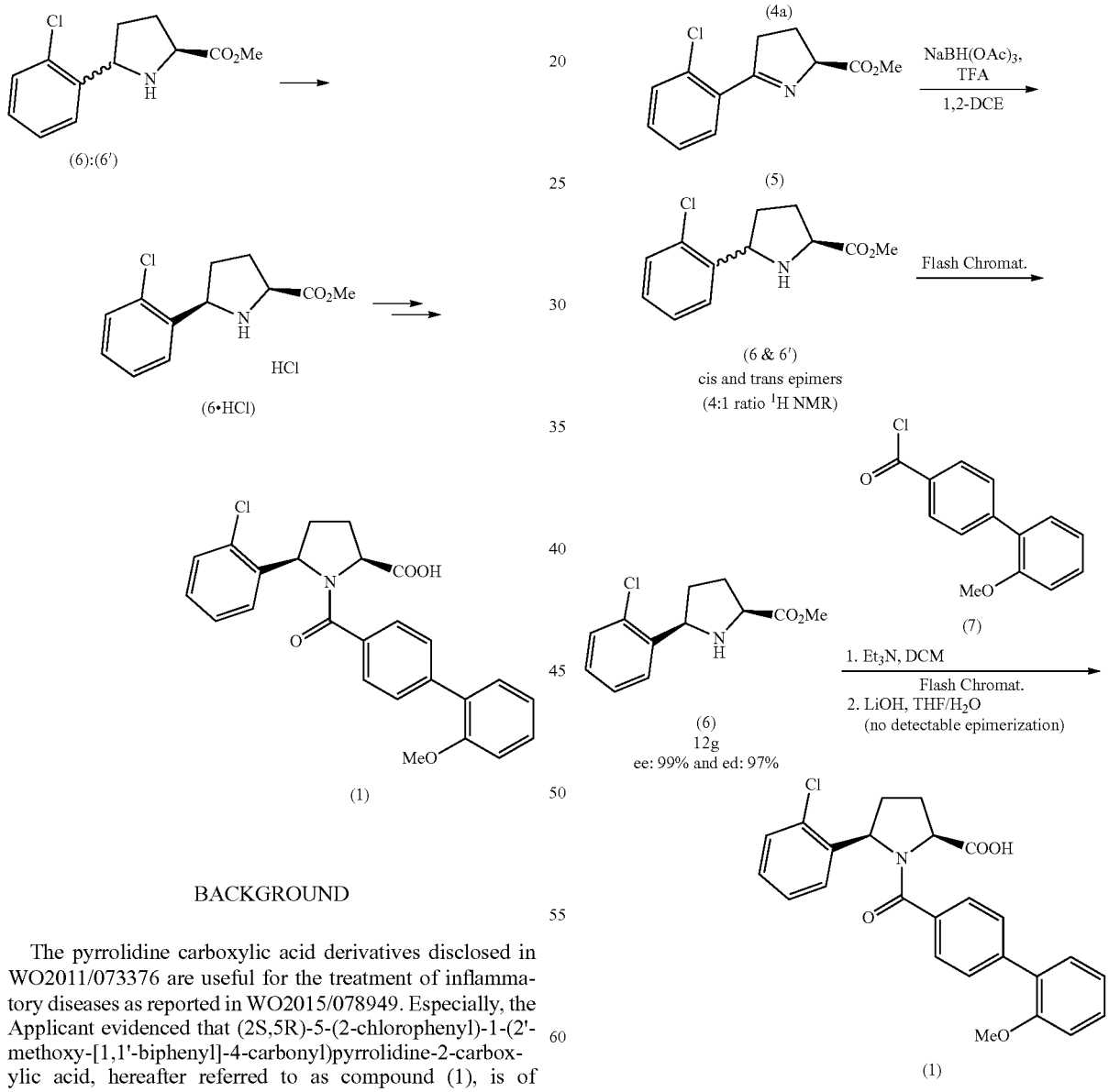

BACKGROUND

The pyrrolidine carboxylic acid derivatives disclosed in WO2011/073376 are useful for the treatment of inflammatory diseases as reported in WO2015/078949. Especially, the Applicant evidenced that (2S,5R)-5-(2-chlorophenyl)-1-(2'-methoxy-[1,1'-biphenyl]-4-carbonyl)pyrrolidine-2-carboxylic acid, hereafter referred to as compound (1), is of particular interest for the treatment of inflammatory diseases.

In WO2011/073376 and WO2015/078949, the synthesis of compound (1) was reported according to the following route of synthesis:

A Grignard reagent was prepared from 1-bromo-2-chlorobenzene (2) in presence of isopropyl magnesium chloride and lithium chloride. This Grignard reagent was added to N-Boc-L-pyroglutamic acid methyl ester (3) to provide intermediate (4a). The work-up of the reaction products included a basic treatment and intermediate (4a) was isolated by flash chromatography. One pot Boc-deprotection and cyclic imine formation under acidic conditions afforded cyclic imine intermediate (5) which was reduced by a borohydride reagent to give the pyrrolidine ester epimeric mixture (6&6'). The epimers were separated by flash chromatographies to isolate pyrrolidine ester intermediate (6), with a diastereomeric excess being at best of 97% after two flash chromatographies. Pyrrolidine ester intermediate (6) was then acylated with acyl chloride (7) using a standard amide coupling procedure. The reaction mixture was purified by flash chromatography; and subsequent saponification of the epimer of interest with lithium hydroxide afforded the desired carboxylic acid compound (1).

This route of synthesis is robust in terms of obtaining good diastereomeric excess (de %) and enantiomeric excess (ee %). However, this route of synthesis of compound (1) is not adapted to scale up. Indeed, multiple steps of purifications by silica gel flash chromatography were needed, one of which being particularly difficult to separate epimers (6) and (6'), which are not adapted to large scales of manufacturing.

In order to overcome above drawbacks and improve overall yield, the Applicant provides the scalable process of the present invention, which includes the preparation of a new intermediate of synthesis, (2S,5R)-methyl 5-(2-chlorophenyl)pyrrolidine-2-carboxylate hydrochloride (6·HCl):

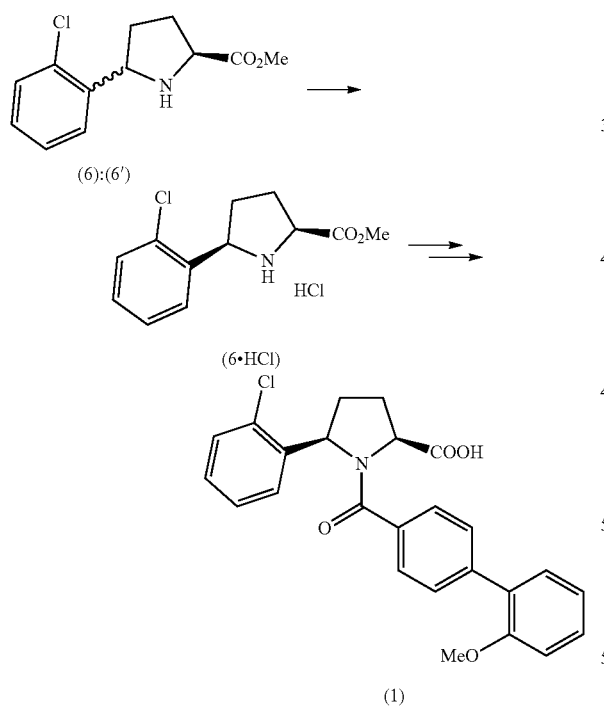

It is also evidenced, as detailed in the experimental part, that the sodium salt of compound (1), hereafter referred to as compounds (1·Na), surprisingly led to enhanced properties compared to the acid form of compound (1) and to other salts. Especially the sodium salt (1·Na) presents a better solubility in water and an improved stability compared to the acid form (1). The present invention thus also relates to the sodium salt (1·Na) and to a process of manufacturing thereof.

SUMMARY

This invention thus relates to a process for the manufacturing of (2S,5R)-methyl 5-(2-chlorophenyl)pyrrolidine-2-carboxylate hydrochloride (6·HCl):

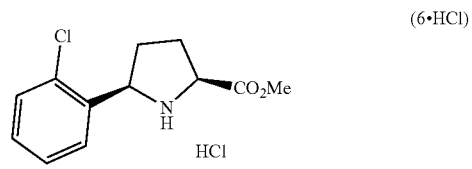 [SMILES: COC(=O)[C@@H]1CC[C@H](c2ccccc2Cl)N1 ; Cl]

comprising a step of hydrochloride salt formation and epimer separation, consisting in crystallizing a mixture of epimers (6) and (6'):

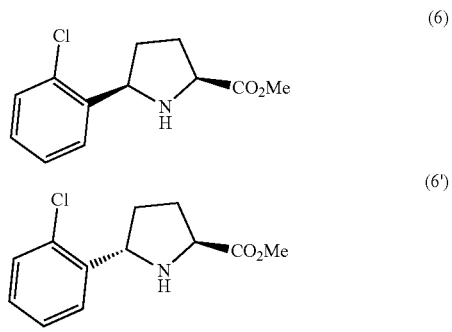

wherein the epimers ratio (6):(6') is at least 4:1,
in presence of hydrochloric acid, in a solvent selected from an alcohol solvent, isopropyl acetate, and mixtures thereof.

In one embodiment, the process of the invention further comprises a subsequent recrystallization step in a solvent selected from an alcohol solvent, isopropyl acetate, and mixtures thereof.

In one embodiment, the alcohol solvent used in the process of the invention is selected from isopropyl alcohol, methanol, and mixtures thereof.

In one embodiment, the mixture of epimers (6) and (6') in which the epimers ratio (6):(6') is at least 4:1, is obtained by reduction with sodium triacetoxyborohydride of compound (5):

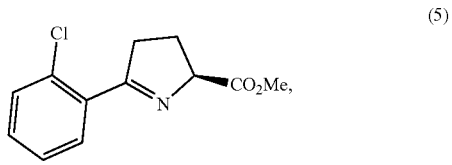 [SMILES: COC(=O)[C@@H]1CCC(c2ccccc2Cl)=N1]

in presence of an acid,
in a solvent selected from dichloromethane, acetonitrile, isopropyl acetate and mixtures thereof; preferably the solvent is dichloromethane.

In one embodiment, the acid is selected from acetic acid and trifluoroacetic acid; preferably the acid is acetic acid.

In one embodiment, compound (5) is obtained by:
a) performing a Knochel-Grignard reaction with compound (2) and compound (3):

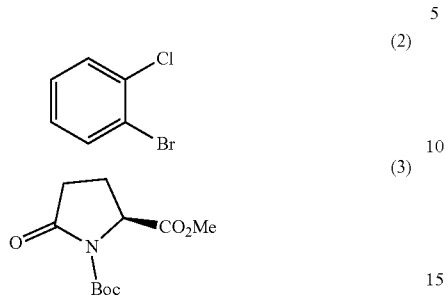
(2)

(3)

in presence of isopropyl magnesium chloride and lithium chloride, and quenched by the addition of an aqueous solution comprising an acid, leading to a mixture of compounds (4a) and (4b):

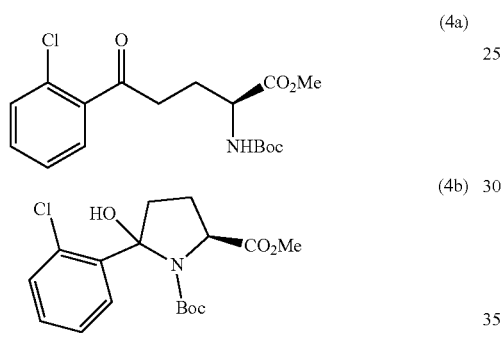
(4a)

(4b)

and
b) contacting the mixture of compounds (4a) and (4b) obtained in step a) with an acid, preferably trifluoroacetic acid or hydrochloric acid,
in a solvent selected from dichloromethane, methanol, isopropyl alcohol, and mixtures thereof, preferably dichloromethane,
at a temperature ranging from 0° C. to 25° C., leading to compound (5).

The invention further relates to a process for the manufacturing of (2S,5R)-5-(2-chlorophenyl)-1-(2'-methoxy-[1,1'-biphenyl]-4-carbonyl)pyrrolidine-2-carboxylic acid (1):

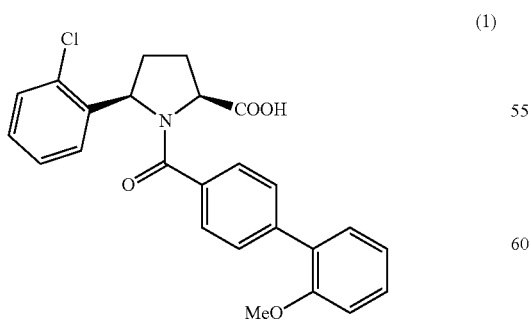
(1)

comprising:
a) the process according to the invention, leading to compound (6·HCl);

b) forming methyl ester (9) from compound (6·HCl) obtained in step a),

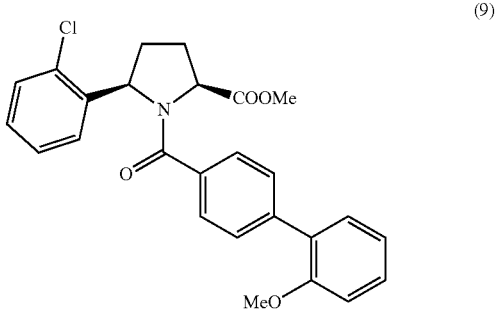
(9)

b1) by acylating compound (6·HCl) with compound (7):

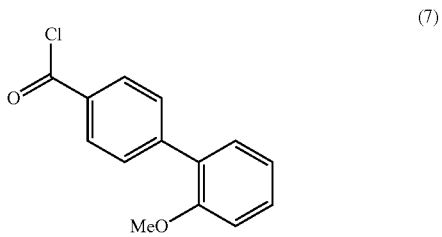 [SMILES: COc1ccccc1-c1ccc(C(=O)Cl)cc1]
(7)

in presence of potassium carbonate, in a mixture of toluene and water as solvent, or b2) by coupling compound (6·HCl) with compound (8):

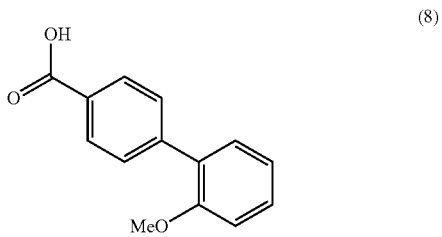 [SMILES: COc1ccccc1-c1ccc(C(=O)O)cc1]
(8)

in presence of a base and an acid-activating agent; and c) saponifying methyl ester (9) in presence of sodium hydroxide and tetra-n-butylammonium bromide (TBAB) in a mixture of toluene and water as solvent, leading to amorphous acid compound (1).

The invention also relates to a process for the manufacturing of sodium (2S,5R)-5-(2-chlorophenyl)-1-(2'-methoxy-[1,1'-biphenyl]-4-carbonyl)pyrrolidine-2-carboxylate (1·Na):

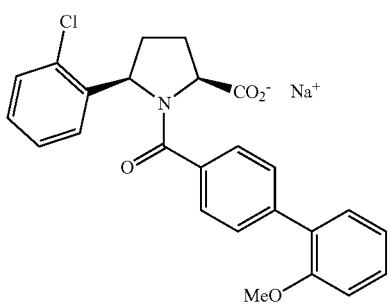

(1·Na)

comprising:
a) the process according to the invention, leading to acid compound (1); and
b) a step of sodium salt formation comprising contacting acid compound (1) obtained in step a) with sodium hydroxide in methanol as solvent, leading to amorphous sodium salt (1·Na).

In one embodiment, the process for manufacturing (1·Na) further comprises an optional step c) of precipitation in presence of isopropyl alcohol.

The invention further provides (2S,5R)-methyl 5-(2-chlorophenyl)pyrrolidine-2-carboxylate hydrochloride (6·HCl):

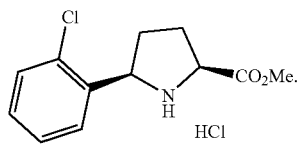

(6·HCl)

The invention also relates to (2S)-1-tert-butyl 2-methyl 5-(2-chlorophenyl)-5-hydroxypyrrolidine-1,2-dicarboxylate (4b):

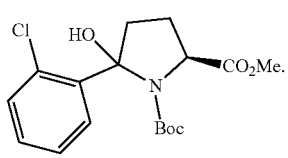

(4b)

Another object of the invention is sodium (2S,5R)-5-(2-chlorophenyl)-1-(2'-methoxy-[1,1'-biphenyl]-4-carbonyl)pyrrolidine-2-carboxylate (1·Na):

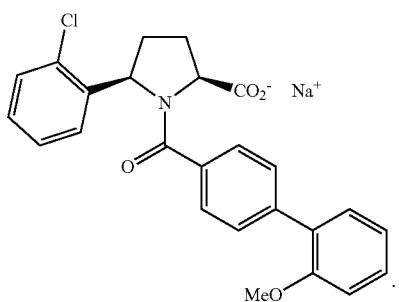

(1·Na)

The invention further provides a pharmaceutical composition comprising sodium (2S,5R)-5-(2-chlorophenyl)-1-(2'-methoxy-[1,1'-biphenyl]-4-carbonyl)pyrrolidine-2-carboxylate (1·Na) and at least one pharmaceutically acceptable carrier. In one embodiment, sodium (2S,5R)-5-(2-chlorophenyl)-1-(2'-methoxy-[1,1'-biphenyl]-4-carbonyl)pyrrolidine-2-carboxylate (1·Na) is for use as a medicament. In one embodiment, sodium (2S,5R)-5-(2-chlorophenyl)-1-(2'-methoxy-[1,1'-biphenyl]-4-carbonyl)pyrrolidine-2-carboxylate (1·Na) is for use in the treatment and/or prevention of inflammation.

DETAILED DESCRIPTION

In the present invention, the following terms have the following meanings:

Alcohol solvent" refers to a substance that dissolves a solute (a chemically distinct liquid, solid or gas), resulting in a solution, and which is an alcohol, i.e. an organic compound comprising at least one hydroxyl functional group (—OH) linked to a carbon atom. Examples of alcohol solvents include methanol, ethanol and isopropyl alcohol.

"Epimer" refers to one of a pair of diastereomers. The two epimers have opposite configuration at only one stereogenic center out of at least two. All other stereogenic centers in the molecule are the same in each epimer. Epimerization refers to the interconversion of one epimer to the other epimer.

"Administration", or a variant thereof (e.g. "administering"), means providing the active agent or active ingredient, alone or as part of a pharmaceutically acceptable composition, to the patient in whom/which the condition, symptom, or disease is to be treated or prevented.

"Patient" refers to a mammal, more preferably a human, who/which is awaiting the receipt of, or is receiving medical care or is/will be the object of a medical procedure.

"Pharmaceutically acceptable" refers to the ingredients of a pharmaceutical composition which are compatible with each other and not deleterious to the subject to which it is administered.

"Pharmaceutically acceptable carrier" refers to a substance that does not produce an adverse, allergic or other untoward reaction when administered to an animal, preferably a human. It includes any and all inactive substance such as for example solvents, cosolvents, antioxidants, surfactants, stabilizing agents, emulsifying agents, buffering agents, pH modifying agents, preserving agents (or preservating agents), antibacterial and antifungal agents, isotonifiers, granulating agents or binders, lubricants, disintegrants, glidants, diluents or fillers, adsorbents, dispersing agents, suspending agents, coating agents, bulking agents, gelatin (for soft and hard capsules), release agents, absorption delaying agents, sweetening agents, flavoring agents and the like. For human administration, preparations should meet sterility, pyrogenicity, general safety and purity standards as required by regulatory offices, such as, e.g., FDA Office or EMA.

"Prevent", "preventing" and "prevention", as used herein, refer to a method of delaying or precluding the onset of a condition or disease and/or its attendant symptoms, barring a patient from acquiring a condition or disease, or reducing a patient's risk of acquiring a condition or disease.

"Therapeutically effective amount" refers to the amount or dose of active ingredient that is aimed at, without causing significant negative or adverse side effects to the subject, (1) delaying or preventing the onset of a disease, such as an inflammatory disease, in the subject; (2) reducing the severity or incidence of a disease, such as an inflammatory disease; (3) slowing down or stopping the progression, aggravation, or deterioration of one or more symptoms of a disease, such as an inflammatory disease, affecting the subject; (4) bringing about ameliorations of the symptoms of a disease, such as an inflammatory disease, affecting the subject; or (5) curing a disease, such as an inflammatory disease, affecting the subject. A therapeutically effective amount may be administered prior to the onset of a disease, such as an inflammatory disease, for a prophylactic or preventive action. Alternatively, or additionally, a therapeutically effective amount may be administered after initiation of a disease, such as an inflammatory disease, for a therapeutic action.

"Treating" or "treatment" refers to therapeutic treatment; wherein the object is to prevent or slow down the targeted pathologic condition or disease, such as an inflammatory disease. A subject or mammal is successfully "treated" for a disease or affection or condition, such as an inflammatory disease, if, after receiving the treatment according to the present invention, the subject or mammal shows one or more of the following: observable and/or measurable reduction or absence of one or more of the symptoms associated with the specific disease or condition, such as an inflammatory disease; reduced morbidity and mortality; and/or improvement in quality of life issues. The above parameters for assessing successful treatment and improvement in the disease are readily measurable by routine procedures familiar to a physician.

"Subject" refers to a mammal, preferably a human. In one embodiment, the subject is diagnosed with a disease, such as an inflammatory disease. In one embodiment, the subject is a patient, preferably a human patient, who/which is awaiting the receipt of, or is receiving, medical care or was/is/will be the subject of a medical procedure or is monitored for the development or progression of a disease, such as an inflammatory disease. In one embodiment, the subject is a human patient who is treated and/or monitored for the development or progression of a disease, such as an inflammatory disease. In one embodiment, the subject is a male. In another embodiment, the subject is a female. In one embodiment, the subject is an adult. In another embodiment, the subject is a child.

Manufacturing Process of Acid Compound (1)

The present invention thus relates to a new scalable process of manufacturing of acid compound (1).

Manufacturing of Hydrochloride Salt Intermediate (6·HCl)

Especially, the use of a new intermediate of synthesis, the hydrochloride salt of (2S,5R)-methyl 5-(2-chlorophenyl)pyrrolidine-2-carboxylic acid (6·HCl) is provided, instead of using the corresponding pyrrolidine ester (6). Indeed, the separation of epimers (6) and (6') to isolate the intermediate (6) required a purification by flash chromatographies in the previously disclosed process, which was a hardly scalable step.

Instead, in the process of the invention, the mixture of epimers (6) and (6') is separated by crystallization of hydrochloride salt, leading to hydrochloride salt (6·HCl), with excellent enantiomeric and diastereomeric excesses. The isolation of hydrochloride salt (6·HCl) by crystallization avoids to have to perform a purification by flash chromatography in order to isolate epimer (6).

The invention thus provides a process for the manufacturing of (2S,5R)-methyl 5-(2-chlorophenyl)pyrrolidine-2-carboxylate hydrochloride (6·HCl):

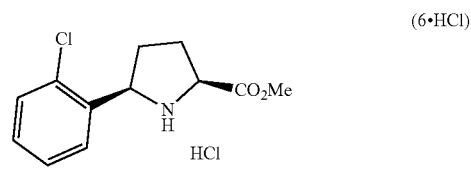 [SMILES: COC(=O)[C@@H]1CC[C@H](c2ccccc2Cl)N1 ; Cl]

(6·HCl)

comprising a step of hydrochloride salt formation and epimer separation, consisting in crystallizing a mixture of epimers (6) and (6'):

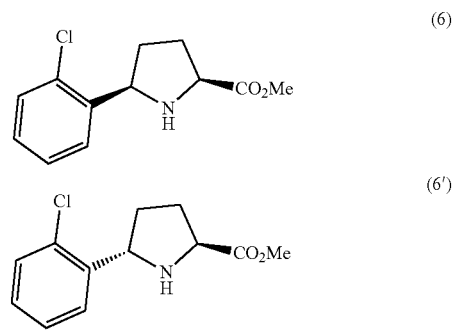

wherein the epimers ratio (6):(6') is at least 4:1,
in presence of hydrochloric acid, in a solvent selected from an alcohol solvent, isopropyl acetate, and a mixture thereof.

In one embodiment, the process of manufacturing of (6·HCl) further comprises a subsequent recrystallization step in a solvent selected from an alcohol solvent, isopropyl acetate, and mixtures thereof.

In one embodiment, the alcohol solvent used in crystallization and/or recrystallisation step is selected from isopropyl alcohol, methanol, and mixtures thereof.

In one embodiment, the solvent used for the recrystallisation step is the same as the one used in the crystallization step.

In one embodiment, the solvent used in crystallization and/or recrystallisation step is isopropyl alcohol. In another embodiment, the solvent used in crystallization and/or recrystallisation step is a mixture of isopropyl alcohol and isopropyl acetate. In another embodiment, the solvent used in crystallization and/or recrystallisation step is a mixture of methanol and isopropyl acetate.

In one embodiment, the duration of the crystallization step is ranging from 0.5 hour to 24 hours, preferably at least 1 hour.

In one embodiment, the temperature of the crystallization step is ranging from 0° C. to room temperature (about 25° C.), preferably from 0° C. to 15° C., more preferably from 0° C. to 5° C.

During the step of hydrochloride salt formation and crystallization, the corresponding hydrochloride salt epimer (6'·HCl) is also formed:

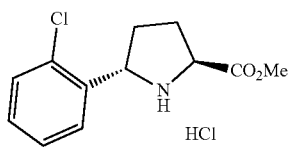

(6'·HCl)

In one embodiment, with this process of manufacturing, the hydrochloride salt (6·HCl) is isolated with an epimer ratio (6·HCl):(6'·HCl) of at least 94:6, preferably at least 98:2, more preferably of more than 99:1. According to one embodiment, the epimer ratio can be expressed in percentages of HPLC areas, in mass percent or in mole percent. The ratios expressed in mass percent and in mole percent are identical. In one embodiment, the ratios expressed in percentages of HPLC areas, in mass percent and in mole percent are identical.

Preparation of the Mixture of Epimers (6) and (6')

The mixture of epimers (6) and (6') should present an epimer ratio (6):(6') of at least 4:1 so that hydrochloride salt (6·HCl) can be isolated with high purity.

In one embodiment, the mixture of epimers (6) and (6') wherein the epimers ratio (6):(6') is at least 4:1, is obtained by reduction with sodium triacetoxyborohydride of compound (5):

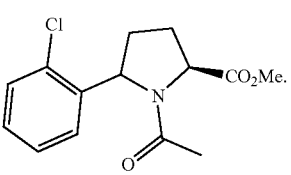

(5)

in presence of an acid, in a solvent selected from dichloromethane, acetonitrile, isopropyl acetate and mixtures thereof.

In one embodiment, the acid is selected from acetic acid and trifluoroacetic acid; preferably the acid is acetic acid.

In one embodiment, the solvent is preferably dichloromethane, more preferably dry dichloromethane.

In one embodiment, a solution comprising compound (5), the acid and the solvent of the reaction is gradually added to a solution comprising sodium triacetoxyborohydride and the solvent of the reaction.

In one embodiment, the reduction is conducted at a temperature ranging from 0° C. to 5° C. In one embodiment, the reaction is stopped before complete reduction of (5). Preferably, the reduction reaction is stopped after a time of reaction ranging from 3 hours to 20 hours, preferably from 9 hours to 20 hours, more preferably from 12 hours to 18 hours. This presents the advantage to avoid the formation of a too large amount of the following acylated byproduct (N-Ac-6):

(N-Ac-6)

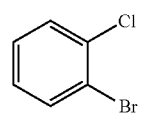

In one embodiment, the reaction is stopped by the addition of a saturated solution of sodium carbonate.

Preparation of Cyclic Imine Intermediate (5)

In one embodiment, compound (5) is obtained by:

a) performing a Knochel-Grignard reaction with compound (2) and compound (3):

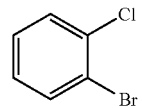

(2)

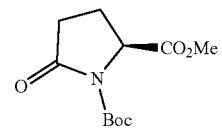

(3)

in presence of isopropyl magnesium chloride and lithium chloride, leading to a mixture of compounds (4a) and (4b):

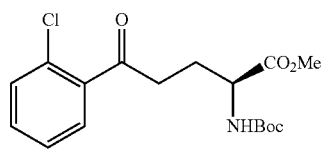

(4a)

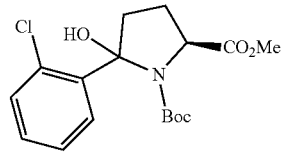

(4b)

and b) contacting the mixture of compounds (4a) and (4b) obtained in step a) with an acid; in a solvent selected from dichloromethane, methanol, isopropyl alcohol, and mixtures thereof; at a temperature ranging from 0° C. to 25° C.; leading to compound (5).

In one embodiment, compound (5) is obtained by:

a) performing a Knochel-Grignard reaction with compound (2) and compound (3):

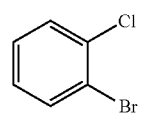

(2)

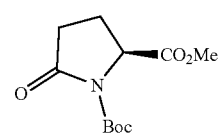

(3)

in presence of isopropyl magnesium chloride and lithium chloride, and quenched by the addition of an aqueous solution comprising an acid, leading to a mixture of compounds (4a) and (4b):

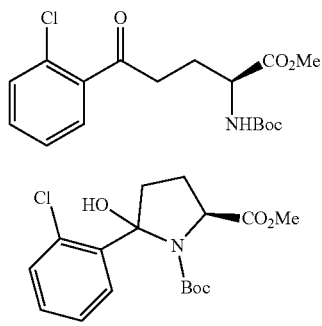

(4a)

(4b)

and b) contacting the mixture of compounds (4a) and (4b) obtained in step a) with an acid; in a solvent selected from dichloromethane, methanol, isopropyl alcohol, and mixtures thereof; at a temperature ranging from 0° C. to 25° C.; leading to compound (5).

In one embodiment, in step a), a Grignard reagent is first prepared from 1-bromo-2-chlorobenzene (2) in presence of isopropyl magnesium chloride and lithium chloride. Then, the Grignard reagent is added to N-Boc-L-pyroglutamic acid methyl ester (3) to provide intermediates (4a) and (4b).

In one embodiment, step a) is performed in THF as solvent, preferably dry THF.

In one embodiment, step a) is conducted at a temperature ranging from 0° C. to 25° C. Preferably, the formation of the Grignard reagent is performed at a temperature ranging from 15° C. to 25° C., after that the reactants were mixed at a temperature ranging from 0° C. to 5° C. In one embodiment, the formation of intermediates (4a) and (4b) from the Grignard reagent is performed at a temperature ranging from 0° C. to 5° C.

In one embodiment, the reaction of step a) is quenched by the addition of an aqueous solution.

By "quenching" or related term "quenched", it is referred to the action to deactivate any unreacted reagents of a chemical reaction. In the Knochel-Grignard reaction of the process of the invention, unreacted Grignard reagent is deactivated by the addition of an aqueous solution.

In one embodiment, the reaction of step a) is quenched by acid treatment, by the addition of an aqueous solution comprising an acid. In one embodiment, the aqueous solution comprising an acid used for quenching the reaction is selected from aqueous solutions of citric acid or acetic acid. Preferably, the reaction is quenched using an aqueous solution of citric acid. In one embodiment, the quenching of the reaction by the addition of an aqueous solution comprising an acid does not necessarily lead to an acid pH for the reaction mixture. In one embodiment, the quenching by acid treatment enables to set the pH 4 starting from pH 12 in the reaction mixture.

In one embodiment, the reaction of step a) is not quenched by a basic treatment.

In one embodiment, intermediates (4a) and (4b) are not isolated, even less by a purification by flash chromatography.

In one embodiment, the acid used in step b) is trifluoroacetic acid (TFA) or hydrochloric acid; preferably trifluoroacetic acid.

In one embodiment, the solvent used in step b) is preferably dichloromethane, more preferably dry dichloromethane. In one embodiment, in step b), when TFA is used as acid, the solvent is dichloromethane, preferably dry dichloromethane. In another embodiment, the solvent used in step b) is preferably methanol or isopropyl alcohol. In one embodiment, in step b), when hydrochloric acid is used as acid, the solvent is methanol or isopropyl alcohol.

In one embodiment, step b) is conducted for a period of time ranging from 1 hour to 50 hours preferably from 15 h to 50 hours; more preferably from 20 hours to 45 hours. In one embodiment, the acid used in step b) is TFA and the reaction is conducted for a period of time ranging from 15 h to 50 hours; preferably from 18 hours to 48 hours; from 18 hours to 23 hours or from 24 hours to 44 hours.

Manufacturing of Compound (1)

The present invention thus also relates to a process for the manufacturing of the amorphous form of (2S,5R)-5-(2-chlorophenyl)-1-(2'-methoxy-[1,1'-biphenyl]-4-carbonyl)pyrrolidine-2-carboxylic acid (1):

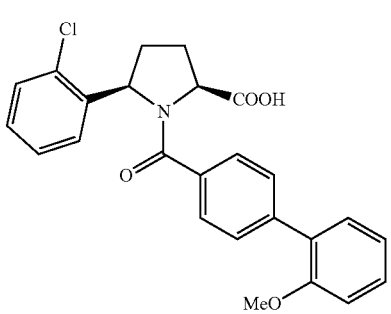

(1)

comprising:

a) the process for manufacturing hydrochloride salt (6·HCl) of the present invention;
b) forming methyl ester (9) from compound (6·HCl) obtained in step a),

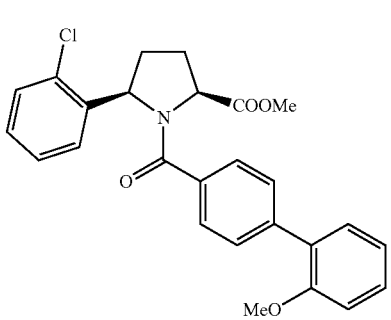

(9)

b1) by acylating compound (6·HCl) with compound (7):

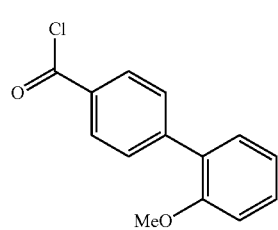

(7)

in presence of potassium carbonate, in a mixture of toluene and water as solvent;

or b2) by coupling compound (6·HCl) with compound (8):

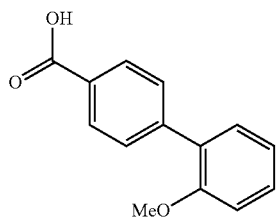

(8)

in presence of a base and an acid-activating agent; and c) saponifying methyl ester (9) in presence of sodium hydroxide and tetra-n-butylammonium bromide (TBAB) in a mixture of toluene and water as solvent, leading to amorphous acid compound (1).

The present invention thus also relates to a process for the manufacturing of the amorphous form of (2S,5R)-5-(2-chlorophenyl)-1-(2'-methoxy-[1,1'-biphenyl]-4-carbonyl) pyrrolidine-2-carboxylic acid (1):

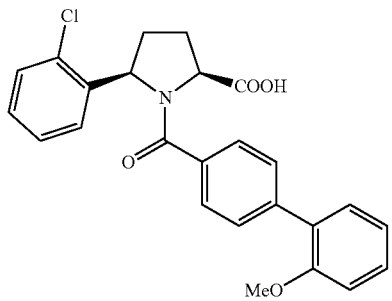

(1)

comprising:

a) the process for manufacturing hydrochloride salt (6·HCl) of the present invention;
b) (b1) forming methyl ester (9) by acylating compound (6·HCl) obtained in step a) with compound (7):

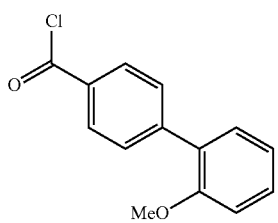

(7)

in presence of potassium carbonate, in a mixture of toluene and water as solvent; and c) saponifying methyl ester (9) in presence of sodium hydroxide and tetra-n-butylammonium bromide (TBAB) in a mixture of toluene and water as solvent, leading to amorphous acid compound (1).

In one embodiment, the acid chloride (7) is obtained from the corresponding acid (8):

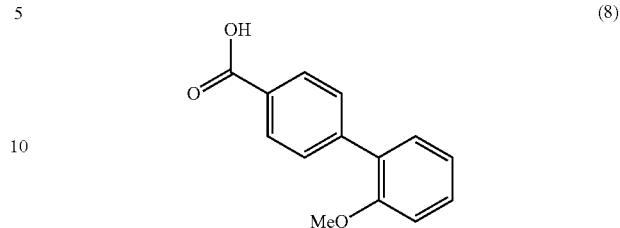

(8)

by reaction with $SOCl_2$ in presence of catalytic dimethylformamide (DFM), preferably in toluene as solvent.

The present invention thus also relates to a process for the manufacturing of the amorphous form of (2S,5R)-5-(2-chlorophenyl)-1-(2'-methoxy-[1,1'-biphenyl]-4-carbonyl) pyrrolidine-2-carboxylic acid (1) comprising:

a) the process for manufacturing hydrochloride salt (6·HCl) of the present invention;
b) (b2) forming methyl ester (9) by coupling compound (6·HCl) with compound (8):

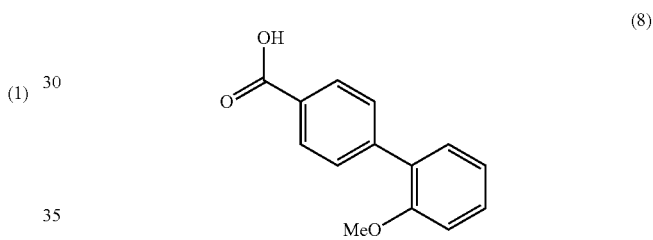

(8)

in presence of a base and an acid-activating agent; and c) saponifying methyl ester (9) in presence of sodium hydroxide and tetra-n-butylammonium bromide (TBAB) in a mixture of toluene and water as solvent, leading to amorphous acid compound (1).

In step b2), the acid-activating agent can be selected from known activating agent for acid-amine coupling, such as for example: propylphosphonic anhydride (T3P), N,N'-dicyclohexylcarbodiimide (DCC), N-(3-dimethylaminopropyl)-N'-ethylcarbodiimide hydrochloride (EDCI-HCl), or 1-[Bis(dimethylamino)methylene]-1H-1,2,3-triazolo[4,5-b] pyridinium 3-oxide hexafluorophosphate (HATU). In one embodiment, the acid-activating agent is selected from T3P, DCC, EDCI-HCl and HATU, preferably the acid-activating agent is T3P.

In step b2), the base is for example triethylamine (TEA), diisopropylethylamine (DIEA) or N-methylmorpholine (NMM).

In one embodiment, step b2) is conducted in a solvent selected from dimethylformamide (DMF), dichloromethane (DCM), isopropylacetate (iPrOAC) and acetonitrile (CAN).

In one embodiment, step b2) is conducted at a temperature ranging from room temperature (about 25° C.) to 60° C.

In one embodiment, the duration of step b2) is ranging from 1 hour to 20 hours.

In one embodiment, the process for manufacturing compound (1) further comprises a subsequent step d) of precipitation in presence of cyclohexane. According to one embodiment, at the end of the saponification of step c), toluene can be partly evaporated to concentrate the reaction mixture and cyclohexane can then be added in a toluene:cyclohexane volume ratio of 1:8 to 1:10.

In one embodiment, step b) of the process for manufacturing compound (1) does not involve a purification by flash chromatography.

In one embodiment, the process for manufacturing compound (1) is as reported in the scheme below:

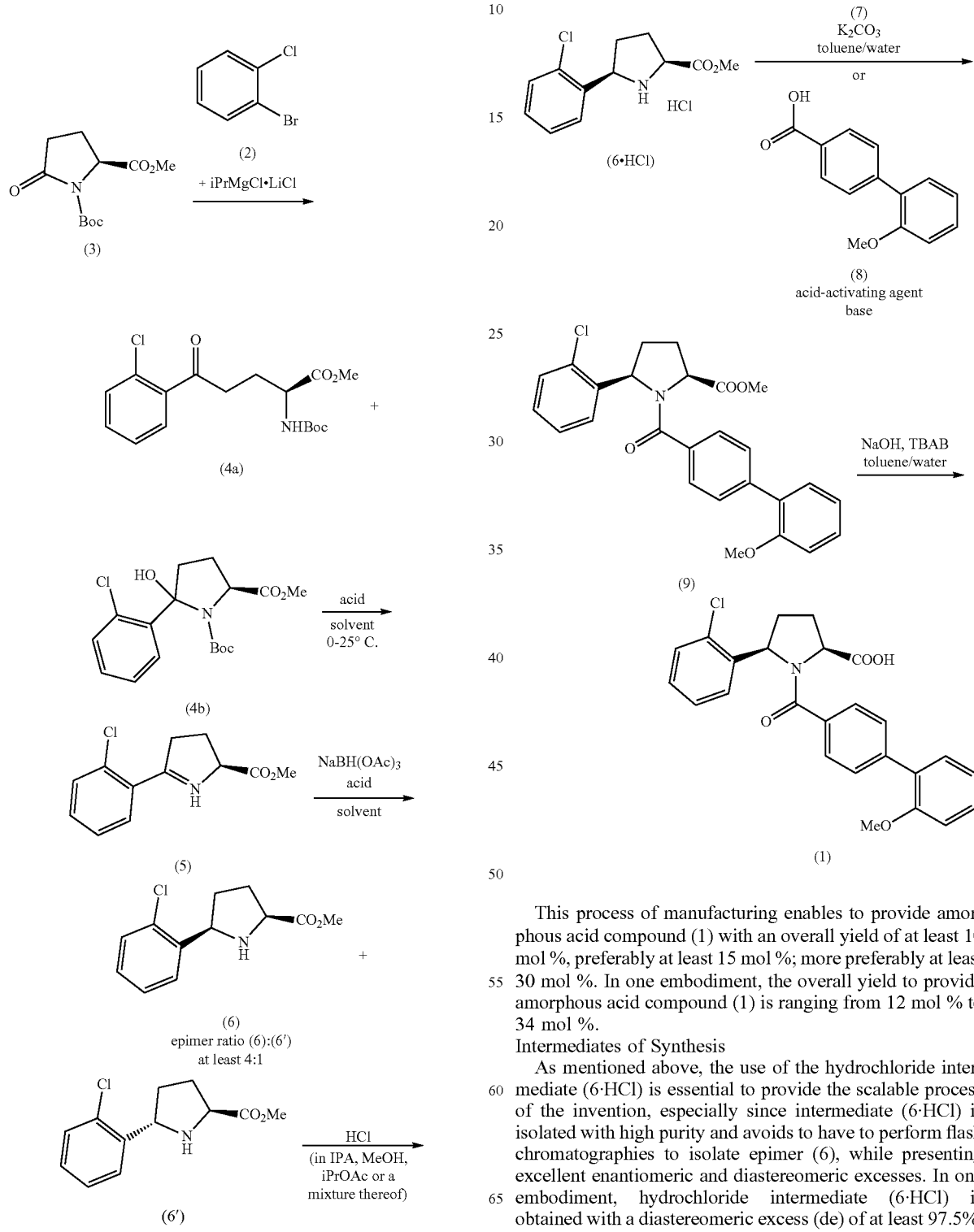

This process of manufacturing enables to provide amorphous acid compound (1) with an overall yield of at least 10 mol %, preferably at least 15 mol %; more preferably at least 30 mol %. In one embodiment, the overall yield to provide amorphous acid compound (1) is ranging from 12 mol % to 34 mol %.

Intermediates of Synthesis

As mentioned above, the use of the hydrochloride intermediate (6·HCl) is essential to provide the scalable process of the invention, especially since intermediate (6·HCl) is isolated with high purity and avoids to have to perform flash chromatographies to isolate epimer (6), while presenting excellent enantiomeric and diastereomeric excesses. In one embodiment, hydrochloride intermediate (6·HCl) is obtained with a diastereomeric excess (de) of at least 97.5%, usually with a de of about 99.6%. In one embodiment, hydrochloride intermediate (6·HCl) is obtained with an enantiomeric excess (ee) of about 99.9%, and even with an ee of more than 99.9%.

The invention thus also relates to (2S,5R)-methyl 5-(2-chlorophenyl)pyrrolidine-2-carboxylate hydrochloride (6·HCl):

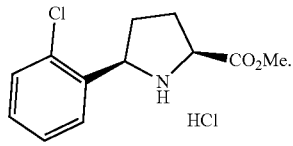

(6·HCl)

The use of intermediate (4b), together with previously disclosed intermediate (4a), enables in the process of the invention to obtain intermediate (5) with improved yields compared to the previously reported process. Intermediate (4b) was never obtained in the previously reported process. The obtention of (4b) was rendered possible in the process of the present invention by the acid treatment used for quenching the Knochel-Grignard reaction conducted with reactants (2) and (3).

The invention thus also relates to (2S)-1-tert-butyl 2-methyl 5-(2-chlorophenyl)-5-hydroxypyrrolidine-1,2-dicarboxylate (4b):

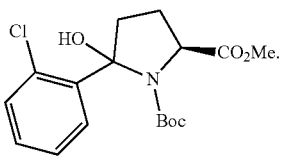

(4b)

Sodium Salt of Compound (1)

As detailed in the experimental part, it was evidenced that the sodium salt of compound (1), i.e. compounds (1·Na), surprisingly led to enhanced properties compared to the acid form of compound (1) and to other salts. Especially the sodium salt (1·Na) presents a better solubility in water and an improved stability.

The invention thus also relates to sodium (2S,5R)-5-(2-chlorophenyl)-1-(2'-methoxy-[1,1'-biphenyl]-4-carbonyl)pyrrolidine-2-carboxylate (1·Na):

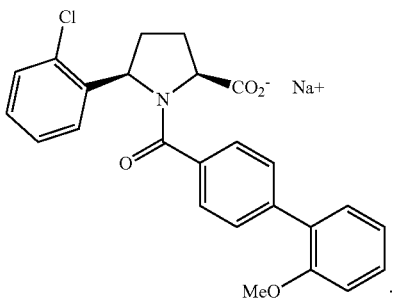

(1·Na)

In one embodiment, sodium (2S,5R)-5-(2-chlorophenyl)-1-(2'-methoxy-[1,1'-biphenyl]-4-carbonyl)pyrrolidine-2-carboxylate (1·Na) is amorphous.

The present invention further relates to a process for the manufacturing of sodium (2S,5R)-5-(2-chlorophenyl)-1-(2'-methoxy-[1,1'-biphenyl]-4-carbonyl)pyrrolidine-2-carboxylate (1·Na):

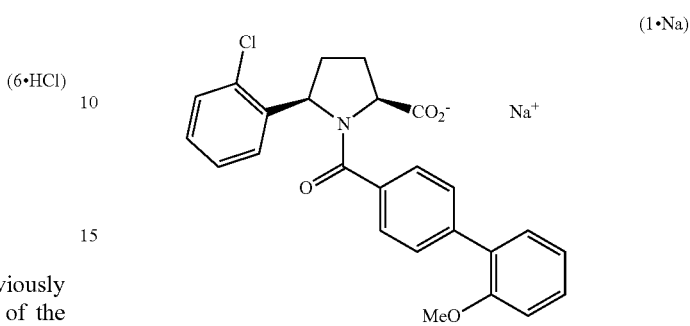

(1·Na)

comprising:
a) the process according to the present invention for manufacturing acid compound (1), as described above; and
b) a step of sodium salt formation comprising contacting acid compound (1) obtained in step a) with sodium hydroxide in methanol as solvent, leading to amorphous sodium salt (1·Na).

In one embodiment, the process of manufacturing of sodium salt (1·Na) further comprises an optional step c) of precipitation in presence of isopropyl alcohol. In one embodiment, the step c) is performed by solvent swap distillation.

This process of manufacturing enables to provide sodium salt (1·Na) with an overall yield of at least 10 mol %, preferably at least 15 mol %, more preferably at least 30 mol %. In one embodiment, the process of the invention provides sodium salt (1·Na) with an overall yield ranging from 10 to 33 mol %. This process of manufacturing also enables to provide sodium salt (1·Na) with enantiomeric and diastereomeric excesses of more than 97.6%, preferably more than 99.5%.

As its corresponding acid form, sodium salt (1·Na) is particularly useful for the treatment of inflammatory diseases. Therefore, the present invention further provides a pharmaceutical composition comprising sodium (2S,5R)-5-(2-chlorophenyl)-1-(2'-methoxy-[1,1'-biphenyl]-4-carbonyl)pyrrolidine-2-carboxylate (1·Na) and at least one pharmaceutically acceptable carrier.

The invention also relates to sodium (2S,5R)-5-(2-chlorophenyl)-1-(2'-methoxy-[1,1'-biphenyl]-4-carbonyl)pyrrolidine-2-carboxylate (1·Na) for use as a medicament.

Especially, the invention relates to sodium (2S,5R)-5-(2-chlorophenyl)-1-(2'-methoxy-[1,1'-biphenyl]-4-carbonyl)pyrrolidine-2-carboxylate (1·Na) for use in the treatment and/or prevention of inflammation.

In one embodiment, the compound (1·Na) is for use for delaying in a patient the onset of an inflammatory disease.

In one embodiment, the compound (1·Na) is for use for the treatment and/or prevention of the diseases selected from the group consisting of rheumatoid arthritis; inflammatory bowel disease (IBD) including but not limited to Crohn's disease and ulcerative colitis; colitis; collagenous colitis; lymphocytic colitis; immune-related enterocolitis (including as an adverse event in response to cancer therapy with checkpoint inhibitors such as inhibitors of CTLA-4, PD-1, PD-L1); pouchitis; Celiac disease; irritable bowel syndrome; gut dysbiosis including antibiotic-induced dysbiosis leading to bacterial infection (e.g. *C. difficile* infection, pulmonary pneumococcal infection, etc.); Pagets disease; osteoporosis; multiple myeloma; uveitis; acute and chronic myelogenous leukemia; pancreatic 0 cell destruction; rheumatoid spondylitis; osteoarthritis; gouty arthritis and other arthritis conditions; gout; adult respiratory distress syndrome (ARDS); chronic pulmonary inflammatory diseases; silicosis; pulmonary sarcoidosis; psoriasis; rhinitis; anaphylaxis; contact dermatitis; pancreatitis; allergy; hepatitis including hepatitis B virus infection; asthma; muscle degeneration; cachexia such as cachexia secondary to infection or malignancy, cachexia secondary to acquired immune deficiency syndrome; Reiter's syndrome; type I diabetes; bone resorption disease; graft vs. host reaction; ischemia reperfusion injury; brain trauma; multiple sclerosis; cerebral malaria; sepsis; septic shock; toxic shock syndrome; endotoxic shock; gram negative sepsis; fever and myalgias due to infection such as influenza; pyrosis; inflammatory conditions consequent to the release of anorectic gut hormones (e.g. PYY, GLP-1) such as the inflammatory conditions observed in hyperphagia-related disorders, obesity, type 2 diabetes etc.; microbiome-related neurological and mood disorders, including Autism spectrum disorder, schizophrenia, depression, Major Depressive Disorder, and neurodegenerative diseases characterized by neuroinflammation including Alzheimer's and Parkinson's disease.

In one embodiment, the compound (1·Na) is for use for the treatment and/or prevention of the diseases selected from the group consisting of inflammatory bowel disease (IBD) including but not limited to Crohn's disease and ulcerative colitis; colitis; collagenous colitis; lymphocytic colitis; immune-related enterocolitis (including as an adverse event in response to cancer therapy with checkpoint inhibitors such as inhibitors of CTLA-4, PD-1, PD-L1); pouchitis; Celiac disease; irritable bowel syndrome; gut dysbiosis including antibiotic-induced dysbiosis leading to bacterial infection (e.g. *C. difficile* infection, pulmonary pneumococcal infection, etc.).

The invention also relates to method for treating and/or preventing inflammation in a patient in need thereof, comprising administering to said patient a therapeutically effective amount of sodium (2S,5R)-5-(2-chlorophenyl)-1-(2'-methoxy-[1,1'-biphenyl]-4-carbonyl)pyrrolidine-2-carboxylate (1·Na).

In one embodiment, the invention provides a method for delaying in a patient in need thereof the onset of an inflammatory disease, comprising administering to said patient a therapeutically effective amount of sodium (2S,5R)-5-(2-chlorophenyl)-1-(2'-methoxy-[1,1'-biphenyl]-4-carbonyl) pyrrolidine-2-carboxylate (1·Na).

In one embodiment, the invention provides a method for treating and/or preventing a disease selected from the group consisting of rheumatoid arthritis; inflammatory bowel disease (IBD) including but not limited to Crohn's disease and ulcerative colitis; colitis; collagenous colitis; lymphocytic colitis; immune-related enterocolitis (including as an adverse event in response to cancer therapy with checkpoint inhibitors such as inhibitors of CTLA-4, PD-1, PD-L1); pouchitis; Celiac disease; irritable bowel syndrome; gut dysbiosis including antibiotic-induced dysbiosis leading to bacterial infection (e.g. *C. difficile* infection, pulmonary pneumococcal infection, etc.); Pagets disease; osteoporosis; multiple myeloma; uveitis; acute and chronic myelogenous leukemia; pancreatic 0 cell destruction; rheumatoid spondylitis; osteoarthritis; gouty arthritis and other arthritis conditions; gout; adult respiratory distress syndrome (ARDS); chronic pulmonary inflammatory diseases; silicosis; pulmonary sarcoidosis; psoriasis; rhinitis; anaphylaxis; contact dermatitis; pancreatitis; allergy; hepatitis including hepatitis B virus infection; asthma; muscle degeneration; cachexia such as cachexia secondary to infection or malignancy, cachexia secondary to acquired immune deficiency syndrome; Reiter's syndrome; type I diabetes; bone resorption disease; graft vs. host reaction; ischemia reperfusion injury; brain trauma; multiple sclerosis; cerebral malaria; sepsis; septic shock; toxic shock syndrome; endotoxic shock; gram negative sepsis; fever and myalgias due to infection such as influenza; pyrosis; inflammatory conditions consequent to the release of anorectic gut hormones (e.g. PYY, GLP-1) such as the inflammatory conditions observed in hyperphagia-related disorders, obesity, type 2 diabetes etc.; microbiome-related neurological and mood disorders, including Autism spectrum disorder, schizophrenia, depression, Major Depressive Disorder, and neurodegenerative diseases characterized by neuroinflammation including Alzheimer's and Parkinson's disease; in a patient in need thereof, comprising administering to said patient a therapeutically effective amount of sodium (2S,5R)-5-(2-chlorophenyl)-1-(2'-methoxy-[1,1'-biphenyl]-4-carbonyl)pyrrolidine-2-carboxylate (1·Na).

In one embodiment, the invention provides a method for treating and/or preventing a disease selected from the group consisting of inflammatory bowel disease (IBD) including but not limited to Crohn's disease and ulcerative colitis; colitis; collagenous colitis; lymphocytic colitis; immune-related enterocolitis (including as an adverse event in response to cancer therapy with checkpoint inhibitors such as inhibitors of CTLA-4, PD-1, PD-L1); pouchitis; Celiac disease; irritable bowel syndrome; gut dysbiosis including antibiotic-induced dysbiosis leading to bacterial infection (e.g. *C. difficile* infection, pulmonary pneumococcal infection, etc.); in a patient in need thereof, comprising administering to said patient a therapeutically effective amount of sodium (2S,5R)-5-(2-chlorophenyl)-1-(2'-methoxy-[1,1'-biphenyl]-4-carbonyl)pyrrolidine-2-carboxylate (1·Na).

The invention also relates to the use of sodium (2S,5R)-5-(2-chlorophenyl)-1-(2'-methoxy-[1,1'-biphenyl]-4-carbonyl)pyrrolidine-2-carboxylate (1·Na) for the manufacture of a medicament for the treatment and/or prevention of inflammation.

In one embodiment, the invention provides the use of compound (1·Na) for the manufacture of a medicament for delaying in a patient the onset of an inflammatory disease.

In one embodiment, the invention provides the use of compound (1·Na) for the manufacture of a medicament for the treatment and/or prevention the diseases selected from the group consisting of rheumatoid arthritis; inflammatory bowel disease (IBD) including but not limited to Crohn's disease and ulcerative colitis; colitis; collagenous colitis; lymphocytic colitis; immune-related enterocolitis (including as an adverse event in response to cancer therapy with checkpoint inhibitors such as inhibitors of CTLA-4, PD-1, PD-L1); pouchitis; Celiac disease; irritable bowel syndrome; gut dysbiosis including antibiotic-induced dysbiosis leading to bacterial infection (e.g. *C. difficile* infection, pulmonary pneumococcal infection, etc.); Pagets disease; osteoporosis; multiple myeloma; uveitis; acute and chronic myelogenous leukemia; pancreatic 0 cell destruction; rheumatoid spondylitis; osteoarthritis; gouty arthritis and other arthritis conditions; gout; adult respiratory distress syndrome (ARDS); chronic pulmonary inflammatory diseases; silicosis; pulmonary sarcoidosis; psoriasis; rhinitis; anaphylaxis; contact dermatitis; pancreatitis; allergy; hepatitis including hepatitis B virus infection; asthma; muscle degeneration; cachexia such as cachexia secondary to infection or malignancy, cachexia secondary to acquired immune deficiency syndrome; Reiter's syndrome; type I diabetes; bone resorption disease; graft vs. host reaction; ischemia reperfusion injury; brain trauma; multiple sclerosis; cerebral malaria; sepsis; septic shock; toxic shock syndrome; endotoxic shock; gram negative sepsis; fever and myalgias due to infection such as influenza; pyrosis; inflammatory conditions consequent to the release of anorectic gut hormones (e.g. PYY, GLP-1) such as the inflammatory conditions observed in hyperphagia-related disorders, obesity, type 2 diabetes etc.; microbiome-related neurological and mood disorders, including Autism spectrum disorder, schizophrenia, depression, Major Depressive Disorder, and neurodegenerative diseases characterized by neuroinflammation including Alzheimer's and Parkinson's disease.

In one embodiment, the invention provides the use of compound (1·Na) for the manufacture of a medicament for the treatment and/or prevention the diseases selected from the group consisting of inflammatory bowel disease (IBD) including but not limited to Crohn's disease and ulcerative colitis; colitis; collagenous colitis; lymphocytic colitis; immune-related enterocolitis (including as an adverse event in response to cancer therapy with checkpoint inhibitors such as inhibitors of CTLA-4, PD-1, PD-L1), pouchitis; Celiac disease; irritable bowel syndrome; gut dysbiosis including antibiotic-induced dysbiosis leading to bacterial infection (e.g. *C. difficile* infection, pulmonary pneumococcal infection, etc.).

Generally, sodium salt (1·Na) may be formulated as a pharmaceutical preparation comprising (1·Na) and at least one pharmaceutically acceptable carrier, diluent, excipient and/or adjuvant, and optionally one or more further pharmaceutically active compounds.

By means of non-limiting examples, such a formulation may be in a form suitable for oral administration, for parenteral administration (such as by intravenous, intramuscular or subcutaneous injection or intravenous infusion), for topical administration (including ocular), for administration by inhalation, by a skin patch, by an implant, by a suppository, etc. Such suitable administration forms—which may be solid, semi-solid or liquid, depending on the manner of administration—as well as methods and carriers, diluents and excipients for use in the preparation thereof, will be clear to the skilled person; reference is made to the latest edition of Remington's Pharmaceutical Sciences.

Some preferred, but non-limiting examples of such pharmaceutical preparations include tablets, pills, powders, lozenges, sachets, cachets, elixirs, suspensions, emulsions, solutions, syrups, aerosols, ointments, cremes, lotions, soft and hard gelatin capsules, suppositories, drops, sterile injectable solutions and sterile packaged powders (which are usually reconstituted prior to use) for administration as a bolus and/or for continuous administration, which may be formulated with carriers, excipients, and diluents that are suitable per se for such formulations, such as lactose, dextrose, sucrose, sorbitol, mannitol, starches, gum acacia, calcium phosphate, alginates, tragacanth, gelatin, calcium silicate, microcrystalline cellulose, polyvinylpyrrolidone, polyethylene glycol, cellulose, (sterile) water, methylcellulose, methyl- and propylhydroxybenzoates, talc, magnesium stearate, edible oils, vegetable oils and mineral oils or suitable mixtures thereof. The formulations can optionally contain other substances that are commonly used in pharmaceutical formulations, such as lubricating agents, wetting agents, emulsifying and suspending agents, dispersing agents, desintegrants, bulking agents, fillers, preserving agents, sweetening agents, flavoring agents, flow regulators, release agents, etc. The compositions may also be formulated so as to provide rapid, sustained or delayed release of the active compound(s) contained therein.

The pharmaceutical preparations of the invention are preferably in a unit dosage form, and may be suitably packaged, for example in a box, blister, vial, bottle, sachet, ampoule or in any other suitable single-dose or multi-dose holder or container (which may be properly labelled); optionally with one or more leaflets containing product information and/or instructions for use. Generally, such unit dosages will contain between 0.05 and 1000 mg, and usually between 1 and 500 mg, of sodium salt (1·Na), e.g. about 10, 25, 50, 100, 200, 300 or 400 mg per unit dosage.

Usually, depending on the condition to be prevented or treated and the route of administration, the sodium salt (1·Na) may usually be administered between 0.01 to 100 mg per kilogram, more often between 0.1 and 50 mg, such as between 1 and 25 mg, for example about 0.5, 1, 5, 10, 15, 20 or 25 mg, per kilogram body weight of the patient per day, which may be administered as a single daily dose, divided over one or more daily doses, or essentially continuously, e.g. using a drip infusion.

EXAMPLES

The present invention is further illustrated by the following examples. Reaction schemes as described in the example section illustrate by way of example different possible approaches.

Material and Methods

All reported temperatures are expressed in degrees Celsius (° C.); all reactions were carried out at room temperature (rt) unless otherwise stated. The term "room temperature" as used herein means a temperature comprised between 10° C. and 30° C., preferably 20±5° C.

Reactant: Solvents, reagents and starting materials were purchased and used as received from commercial vendors unless otherwise specified.

The following abbreviations are used:
a %: area percent by HPLC,
AcOH: acetic acid,
cc: concentrate,
DMF: dimethylformamide,
dr: diastereomeric ratio,
ee: enantiomeric excess,
eq: equivalent,
g: gram(s),
GC: gas chromatography,
HPLC: high performance liquid chromatography,
IPA: isopropyl alcohol,
iPrOAc: isopropyl acetate,
L: liter(s),
MeCN: acetonitrile,
MeOH: methanol,
M: mol/L,
mL: milliliter(s),
mol: mole(s),
mmol: Millimole(s),
min/mins: minute(s),
MTBE: methyl tert-butyl ether,
sat.: saturated,
T3P: propylphosphonic anhydride;
TEA: triethylamine;
TFA: trifluoroacetic acid,
THF: tetrahydrofuran,
vol.: volume(s).

All compounds disclosed in the present application were named using ChemDraw Ultra 12® purchased from CambridgeSoft (Cambridge, MA, USA).
General procedure: The general route of synthesis is as represented on the scheme below:
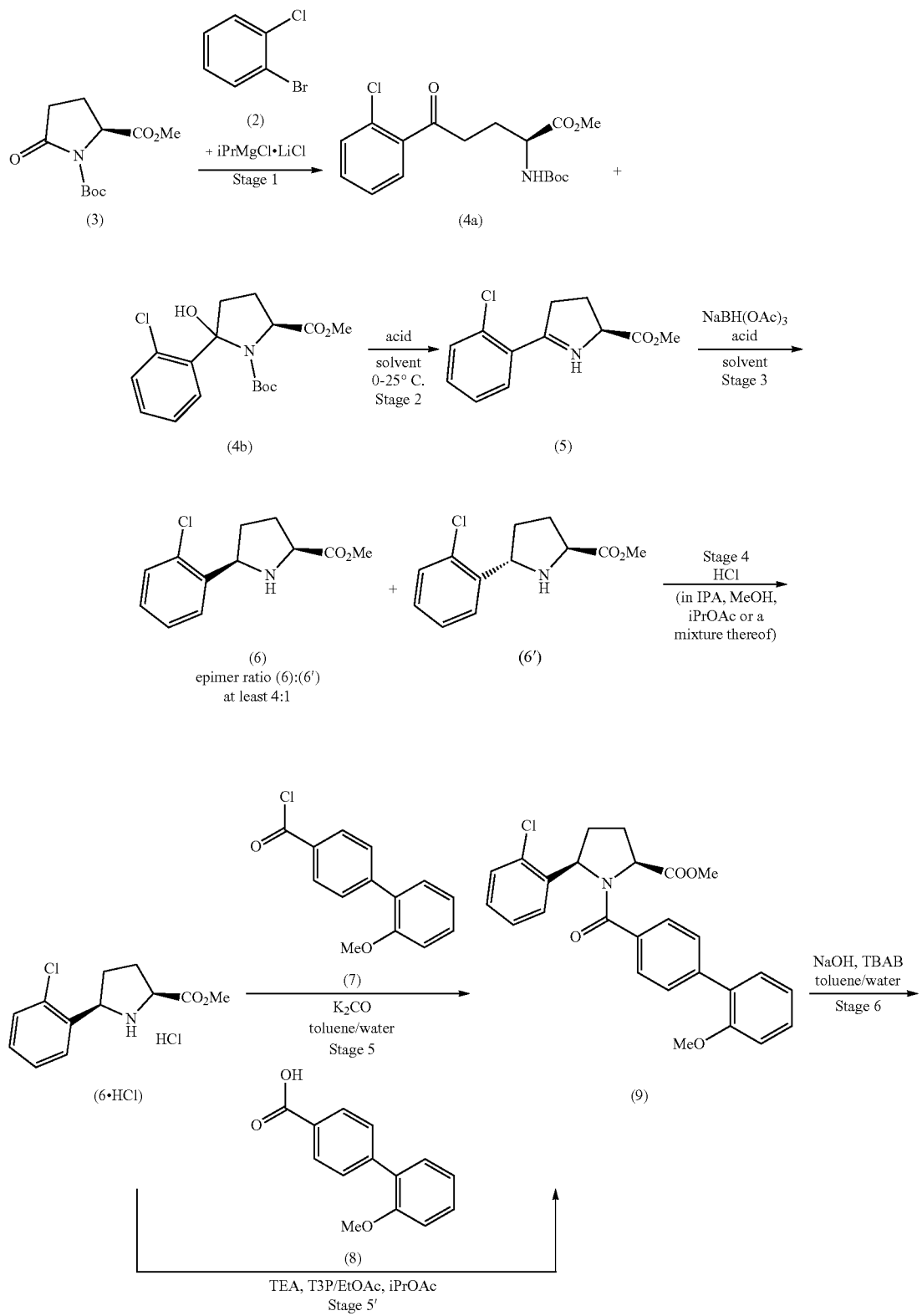

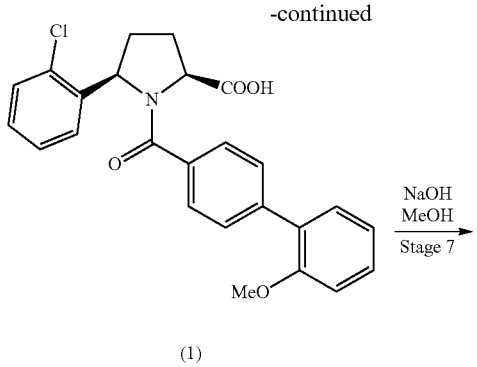

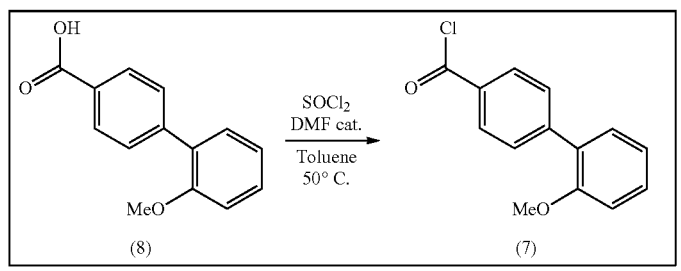

Analytics
Reverse-Phase HPLC Method
For Stages 1-2
  Column: Kinetex EVO C18 100*2.1 mm*2.6 μm
  Eluent: A: $H_2O$ 0.1% TFA B: ACN
  Flow: 0.5 ml/min
  Temperature: 25° C.
  Gradient: A:B 98:2(1 min)-9-10:90(3 min)-0.1-98:2 (9.9 min)
  Detection: 210 nm
  Retention times: (3) 8.6 min; (4a) 10.7 min; (4b) 10.9 min; (5) 8.0 min.
For Stages 3-4
  Column: Poroshell 120 EC-C18 150×4.6 mm×2.7 μm
  Eluent: A: 20 mmol ammonium acetate in $H_2O$ B: MeCN
  Temperature: 25° C.
  Flow: 0.5 ml/min
  Gradient: A:B 95:5(2 min)-12 min-10:90(3 min)-0.1 min-95:5 (7.9 min)
  Detection: 210 nm
  Retention times: (5) 12.7 min; (N-Ac-6) 13.1 min; (6) 14.0 min; (6') 14.4 min; (5) 8.0 min
For Stage 5-7
  Column: Kinetex EVO C18 100*2.1 mm*2.6 μm
  Eluent: A: $H_2O$ 0.1% TFA B: ACN
  Temperature: 25° C.
  Flow: 0.5 ml/min
  Gradient: A:B 95:5(0 min)-10-45:55(5 min)-4-10:90(3 min)-0.1-95:5 (7.9 min)
  Detection: 210 nm
  Samples are dissolved in MeCN:water:(TFA)=50:50:(0.1%)
  Retention times: (8) 11.7 min; (1) 13.6 min; (1·Na) 13.6 min; (9) 14.7 min;
Chiral HPLC Method (Normal Phase)
For Stages 3-4
  Column: Lux i-Cellulose-5 100×4.6 mm×5 μm
  Eluent: A: n-Hexane:IPA:DEA=80:20:0.1
  Flow: 0.5 ml/min
  Temperature: 25° C.
  Detection: 230 nm
  Gradient: A: 100 (25 min)
  Samples are dissolved in eluent ~1 mg/mL
  Retention times: (6) 7.1 min; mix of (6), (6'), enantiomer of (6), enantiomer of (6'): 7.1 min, 5.8 min, 8.0 min and 4.7 min, respectively.
For Stages 6-7
  Column: Lux i-Amylose-1 100×4.6 mm×5 μm
  Eluent: A: n-Hexane:IPA:TFA=80:20:0.1
  Flow: 0.5 ml/min
  Temperature: 37° C.
  Gradient: A: 100 (30 min)
  Detection: 280 nm
  Samples are dissolved in eluent ~0.5 mg/mL
  Retention times: (1''') 9.8 min; (1'') 11.5 min; (1') 17.1 min and (1/1·Na) 22.4 min
Structure of Acid Diastereomers:

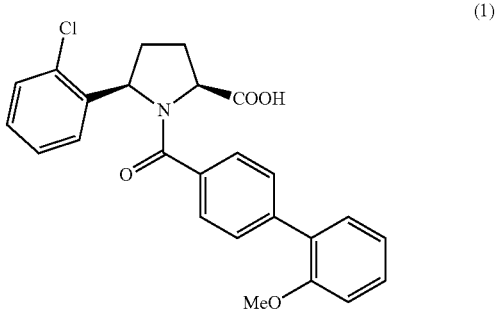 [SMILES: COc1ccccc1-c1ccc(C(=O)N2[C@@H](c3ccccc3Cl)CC[C@H]2C(=O)O)cc1]

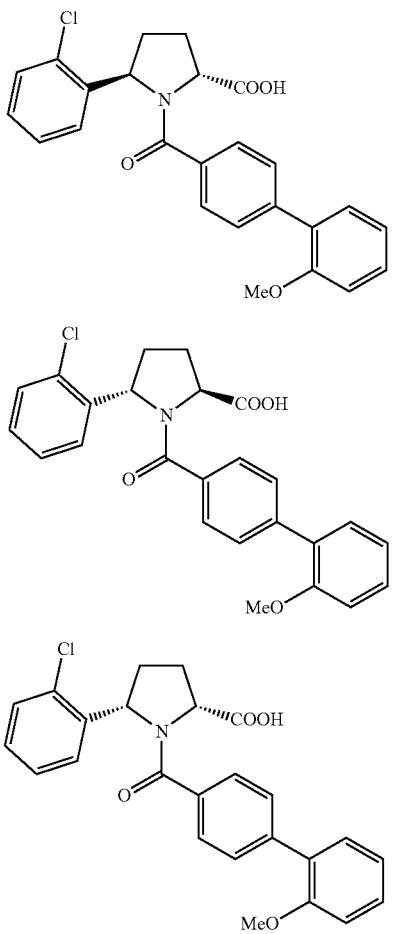

Example 1: Manufacturing of Compound (1) and its Sodium Salt (1·Na) in a 25 g Batch Stage 1: Synthesis of (4a) and (4b): (S)-methyl 2-((tert-butoxycarbonyl)amino)-5-(2-chlorophenyl)-5-oxopentanoate and (2S)-1-tert-butyl 2-methyl 5-(2-chlorophenyl)-5-hydroxypyrrolidine-1,2-dicarboxylate At 0-5° C. under a nitrogen atmosphere, 39.35 g (205.5 mmol, 1.0 eq) 1-bromo-2-chlorobenzene (2) in 34.0 mL THF was added dropwise over 10 mins to a stirred solution of 192 mL (211.2 mmol, 1.02 eq) iPrMgCl·LiCl in THF (commercial, 1.1M in THF) in 32 mL THF. The mixture was allowed to warm to room temperature over 30 mins then stirred for 1 hour at 15-25° C. The mixture was re-cooled to 0° C. and a solution of 50.0 g (50.0 mmol, 1.0 eq) (3) Boc-L-pyroglutamic acid methyl ester in 110 mL THF was added dropwise over 100 mins at 0° C.-5° C. The resulting mixture was stirred at 0° C. until completion (1 hour). The reaction was monitored by HPLC. After completion, keeping the temperature below 5° C., 190 mL 10 weight % citric acid solution was added to the cooled reaction mixture (pH 3.5), then the mixture was let to warm up to 20-25° C. resulting two clear layers. The THF was stripped off at 40° C. in 200-250 mbar at rotary vap at an hour. The remaining aqueous phase with yellow oil was extracted with 2×75 mL CH$_2$Cl$_2$. The water content of the combined organic phases (272 g) was 0.55 w/w %. Around 100 g solvent was evaporated from this solution. To the resulting concentrate 100 g CH$_2$Cl$_2$ was added and removed in vacuo (500 mbar, at 40° C.), which was repeated again. All in all 3×100 g solvent was removed from the product resulting in <0.01 w/w % water content. To determine the content of the resulting solution (151 g), 1.315 g (1 mL) was evaporated giving 603 mg oil. Calculated yield: 94% (69.2 g); HPLC Purity: 59.6 a % (4b) and 28.9 a % (4a).

Stage 2: Synthesis of (5): (S)-methyl 5-(2-chlorophenyl)-3,4-dihydro-2H-pyrrole-2-carboxylate Under a nitrogen atmosphere a 500 ml three-neck round-bottom flask was charged with 90.0 mL (133.2 g, 1168 mmol, 6.0 eq) TFA and 245 mL dry CH$_2$Cl$_2$. The solution was cooled between 0-10° C., then keeping that temperature 69.2 g (194 mmol, 1.0 eq) crude mixture of (4a) and (4b) (HPLC: 59 a % of (4b)) dissolved in 61 mL (81 g) CH$_2$Cl$_2$ (as 151 g solution from Grignard reaction) was added over 30 minutes. The composed yellow mixture was let to warm up to 20-25° C. and stirred at ambient temperature overnight and monitored by HPLC. The mixture gradually became darker. After completion (24 hours stirring), at 20-25° C., 274 mL saturated Na$_2$CO$_3$ solution (made from 56.5 g, 533 mmol Na$_2$CO$_3$ and 257 g deionized water) was added (temperature did not rise). The pH became 7-8. The organic phase was separated; the aqueous phase was extracted with 50 mL CH$_2$Cl$_2$. The combined organic phases were evaporated (at 40° C. in vacuo) to give 38.46 g purple oil (5) (yield 83%). HPLC purity: 94.0 a %.

Stage 3: Synthesis of (6)&(6') mixture: (2S,5R)-methyl 5-(2-chlorophenyl)pyrrolidine-2-carboxylate and (2S,5S)-methyl 5-(2-chlorophenyl)pyrrolidine-2-carboxylate All reactions were carried out under inert atmosphere.

Mixture "A"—Preparation of NaB(OAc)$_3$H. A glass flask was charged with 6.23 g (164.6 mmol, 1.25 eq) NaBH$_4$ and 157 mL dry CH$_2$Cl$_2$. The suspension was cooled to 0° C. and at that temperature 28.25 mL (29.66 g, 493.8 mmol, 3.75 eq) AcOH was added. Intensive gas evolution was observed. The reaction was led to warm up to 20° C. and stirred there for 15 minutes, then cooled back to 0-5° C.

Solution "B"—Preparation of (5) solution. 30.1 mL (31.6 g, 526.8 mmol, 4.0 eq) AcOH was added to a cooled (0-5° C.) solution of 31.3 g (131.7 mmol, 1.0 eq) (5) (isolated) in 31 mL dry CH$_2$Cl$_2$.

Keeping the temperature between 0-5° C., Solution "B" (1.0 eq (5) and 4.0 eq AcOH in CH$_2$Cl$_2$) was added to Mixture "A" (1.25 eq NaB(OAc)$_3$H in CH$_2$Cl$_2$) over 45 minutes. Parallel, 125 mL dry CH$_2$Cl$_2$ was also added to mixture "B" in order to keep it stirrable. The resulting brownish solution was stirred at 0-5° C. for 24 hours and monitored by HPLC. Keeping the temperature below 10° C., to the reaction mixture 200 mL sat Na$_2$CO$_3$ solution was added setting the pH from 4 to 7. (intensive gas evolution). The resulting layers was separated, the aqueous layer was extracted with 50 mL CH$_2$Cl$_2$. The combined organic layers were evaporated in vacuo at 40° C. on rotary vap. Yield:

98.3% (31.05 g (6)&(6') mixture, 129.5 mmol) brown oil. HPLC purity: 73.8 a % of (6) (dr: 84/16).

Stage 4: Crystallization of hydrochloride salt (6·HCl)—(2S,5R)-methyl 5-(2-chlorophenyl)pyrrolidine-2-carboxylate hydrochloride Under inert atmosphere, 27.5 g (114.7 mmol) (6) and (6') (HPLC 73.8 a % of (6); dr: 84/16) was dissolved in 25 mL (1 Vol) IPA. This solution (keeping the temperature below 15° C.) was added to the mixture of 13.15 g HCl in IPA (HCl content: 4.99 g, 137 mmol, 1.19 eq) and 3 mL IPA. The addition was stopped at the half, because the mixture became too dense. To dilute it 28 mL iPrOAc was added, then the addition was continued. The mixture was cooled to 0-5° C., stirred for 20 minutes, then filtered. The filtered solid was washed with 4×14 mL cold iPrOAc and dried in vacuo at 30° C. The obtained white solid (19.3 g) had 94 a % by HPLC. Therefore, the salt (19.3 g) was slurry purified in 58 mL hot IPA. After cooling to 0-5° C. and stirring for 30 min, it was filtered, washed with 2×10 mL cold IPA and dried in vacuo at 30° C. Yield: 51.5% (16.3 g) white solid (6·HCl). HPLC purity: 99.9a %; chiral HPLC purity: 99.9a %.

Stage 5: Synthesis of methyl ester (9): (2S,5R)-methyl 5-(2-chlorophenyl)-1-(2'-methoxy-[1,1'-biphenyl]-4-carbonyl)pyrrolidine-2-carboxylate Solution "A": Under inert atmosphere, 27.47 g (120.4 mmol, 1.0 eq) 2'-methoxy-[1,1'-biphenyl]-4-carboxylic acid (8) was suspended in 137 mL dry toluene, then 425 μL (0.05 eq) DMF was added. At 20-25° C., 9.6 mL (156.4 mmol, 1.3 eq) SOCl₂ was added. The composed suspension was heated to 50° C. and stirred there for 24 hours for form 2'-methoxy-[1,1'-biphenyl]-4-carbonyl chloride (7). The suspension became a yellow solution. Monitoring: HPLC Mixture "B": Under inert atmosphere, 26.7 g (96.79 mmol, 0.9 eq) (6·HCl) was suspended in 81 mL toluene. To this suspension 80.27 g (581 mmol, 5.4 eq) K₂CO₃ dissolved in 72 mL water was added at 10° C.

After 20 minutes stirring, Solution "A" was added to mixture "B" keeping the temperature between 0-10° C. The reaction was let to warm up to 20-25° C. and stirred overnight. The layers were separated, the aqueous phase was extracted with 20 mL toluene, the combined organic phase was washed with 20 mL sat NaCl solution. Yield: 95% (41.38 g) (9). HPLC purity: 97 a % at 254 nm. As 186 g toluene solution.

Stage 6: Synthesis of compound (1): (2S,5R)-5-(2-chlorophenyl)-1-(2'-methoxy-[1,1'-biphenyl]-4-carbonyl)pyrrolidine-2-carboxylic acid Under inert atmosphere, a solution of 9.3 g (232.57 mmol, 4.0 eq) NaOH was dissolved in 65 mL water and 185 mg (0.58 mmol, 0.01 eq) TBAB was added to (at 20-25° C.) 26.16 g (58.14 mmol, 1.0 eq, 91.23 g solution) (9) in toluene. Then mixture was stirred at 20-25° C. for 18 hours and monitored by HPLC (Sample preparation: 20 μL reaction mixture was added to 100 μL toluene and 200 μL 2M HCl, the organic phase was separated and evaporated).

Work up: To the mixture, 23 mL (268 mmol) cc HCl was added to adjust the pH 1. The layers were separated, the aqueous phase was extracted with 26 mL toluene, the combined organic phase was washed with 2×30 mL sat. NaCl solution. The organic phase was subjected to water removal with Dean-Stark trap (130° C. oil temperature). The concentrated toluene solution (1 Vol to (1) content) was added to 8 Vol cyclohexane, then mixture was stirred at 20-25° C. for 4 hours and filtered. Yield: 88% (22.2 g) of amorphous (1). HPLC purity: 95.9 a %. Chiral HPLC purity: 97.4 a %. Water content: 0.14 w/w %.

Stage 7: Sodium salt formation (1·Na): sodium (2S, 5R)-5-(2-chlorophenyl)-1-(2'-methoxy-[1,1'-biphenyl]-4-carbonyl)pyrrolidine-2-carboxylate Procedure A: Under inert atmosphere, 25 g (57.35 mmol, 1.0 eq) compound (1) was dissolved in 75 mL dry MeOH. This solution was cooled to 20-25° C., then 13.1 mL (containing 3.09 g, 57.3 mmol, 1.0 eq) NaOMe solution in MeOH (25 weight %) was added. (Temperature increased to 32° C.). After stirring for 1.5 hours at ambient temperature, the solution was evaporated in vacuo at 40° C. to give 25.6 g white amorphous solid. Yield: 97% (25.6 g) (1·Na). HPLC purity: 96.6 a % (at 210 nm). Chiral HPLC purity: 99.5 a %.

Procedure B (solvent swap): Under inert atmosphere, 10 g (22.94 mmol, 1.0 eq) compound (1) was dissolved in 30 mL dry MeOH. This solution was cooled to 20-25° C., then 5.25 mL (containing 1.24 g, 22.94 mmol, 1.0 eq) NaOMe solution in MeOH (25 weight %) was added (temperature increased to 32° C.). After stirring for 1.5 hours at ambient temperature, 240 mL IPA was added (MeOH:IPA=1:8) and the formed suspension was subjected to solvent swap ($T_{oil}$=95° C., at $T_{oil}$=50° C. it became a clear solution). The concentrated solution (8 Vol, it became cloudy) was cooled to 20-25° C., then filtered. Yield: 92% (9.7 g) (1·Na). HPLC purity: 95.2 a % (at 210 nm). Chiral HPLC purity: 97.5 a %.

Example 2: Manufacturing of Hydrochloride Salt (6·HCl)) in a 400ℓ Batch

Stage 1: Synthesis of (4a) and (4b): (S)-methyl 2-((tert-butoxycarbonyl)amino)-5-(2-chlorophenyl)-5-oxopentanoate and (2S)-1-tert-butyl 2-methyl 5-(2-chlorophenyl)-5-hydroxypyrrolidine-1,2-dicarboxylate Under a nitrogen atmosphere, a 20 L glass reactor was charged with 5100 mL (5.610 mol, 1.05 eq) iPrMgCl·LiCl in THF (commercial, 1.1 M in THF) and 820 mL dry THF. The mixture was cooled to 0-5° C., then to the iPrMgCl·LiCl solution, 1043.6 g (5.451 mmol, 1.02 eq) 1-bromo-2-chlorobenzene (2) dissolved in 910 mL dry THF was added dropwise over 45 mins keeping the temperature below 10° C. The mixture was allowed to warm up to room temperature over 30 mins then stirred for 1 hour at 15-25° C. The reaction was monitored by GC (Sample preparation: 200 μL reaction mixture is added to the mixture of 500 μL sat. NaCl and 500 μL THF, separated and the organic phase used as it is).

After completion the mixture was re-cooled to 0-5° C. over 30 minutes and a solution of 1.30 kg (5.344 mmol, 1.0 eq) Boc-L-pyroglutamic acid methyl ester (3) in 2880 mL dry THF was added dropwise over 90 mins at 0° C.-5° C. The resulting mixture was stirred at 0° C. until completion (1-2 hour). The reaction was monitored by HPLC. After completion, keeping the temperature below 15° C., 5470 mL 10 weight % citric acid solution (from mixture of 600 g citric acid monohydrate and 5.4 L deionized water) was added to the cooled reaction mixture to set the pH 4 from 12, then the mixture was let to warm up to 20-25° C. resulting two clear layers. The THF (~8.3 L) was stripped off at 35-40° C. (inner temperature, while thermostat temperature was 50° C.) in 150-250 mbar vacuo over 4 hours. The remaining aqueous phase with yellow oil was cooled to 20-25° C., then extracted with 2×2.4 L CH$_2$Cl$_2$. The water content of the combined organic phases (~6 L) was 0.74 w/w %. To reduce the water content, 5×1.5 L CH$_2$Cl$_2$ was removed (every time when 1.5 L CH$_2$Cl$_2$ was distilled off it was replaced by fresh CH$_2$Cl$_2$) at 30-35° C. in 550-600 mbar vacuo over 5 hours. The water content became 0.2 w/w %. To determine the content of the resulting 4.61 L (5650 g) solution, 51 mL (63 g) was evaporated giving 18.9 g yellow oil. Calculated yield: 89% (1693.4 g, 4.75 mol) as solution: 4.61 L (5650 g) in CH$_2$Cl$_2$. HPLC purity of the solution: 39.6 a % (4b), 15.9 a % (4a).

Stage 2: Synthesis of (5): (S)-methyl 5-(2-chlorophenyl)-3,4-dihydro-2H-pyrrole-2-carboxylate Under a nitrogen atmosphere a 20 L glass reactor was charged with 5.2 L dry CH$_2$Cl$_2$ and 2268 mL (3356 g, 29.43 mmol, 6.0 eq) TFA. The solution was cooled to 0-10° C., then keeping that temperature 4.2 L (5556 g, containing 1745 g, 4.91 mol, 1.0 eq) crude mixture of (4a) and (4b) as CH$_2$Cl$_2$ solution from Grignard reaction (stage 1) was added over 70 minutes. The composed yellow mixture was let to warm up to 20-25° C. (over 40 min) and stirred at ambient temperature (for 21 hours) and monitored by HPLC. The mixture gradually became darker. After completion (21 hours stirring), at 20-25° C., 6.6 L saturated Na$_2$CO$_3$ solution (from mixture of 1540 g Na$_2$CO$_3$ and 7.0 L deionized water) was added (temperature did not rise) to set the pH to 7.5-8.0 from 1 (it took 90 min). The organic phase was separated, the aqueous phase was extracted with 1.0 L CH$_2$Cl$_2$. The water content of the combined organic phases (10.1 L) was 0.22 w/w %. This organic solution was concentrated to 3.9 L, which was combined 1.0 L dry CH$_2$Cl$_2$ used for rinsing the reactor to remove the remnant of the product. The yield was determined by evaporation of a small sample at 40° C. in vacuo (35.8 g containing 6.9 g product). Calculated yield: 89% (1041 g) (5). HPLC purity: 66.7 a %.

Stage 3: Synthesis of (6)&(6') mixture: (2S,5R)-methyl 5-(2-chlorophenyl)pyrrolidine-2-carboxylate and (2S,5S)-methyl 5-(2-chlorophenyl)pyrrolidine-2-carboxylate All reactions were carried out under inert atmosphere.
Mixture "A"—Preparation of NaB(OAc)$_3$H. A 20 L glass reactor was charged with 5.17 L dry CH$_2$Cl$_2$ and 165.7 g (4.38 mmol, 1.25 eq) NaBH$_4$. The white suspension was cooled to 0-5° C. and at that temperature, 789 g (751 mL, 14.02 mol, 3.75 eq) AcOH was added over 30 minutes. Intensive gas evolution was observed. The reaction was let warm up to 20° C. and stirred for 10 hours, the composed white slurry was cooled to 0-5° C. over 1 hour.
Solution "B"—Preparation of mixture of AcOH and (5). 10 L glass flask was charged with 918 g (3.86 mol corrected to 3.5 mmol (80% based on HPLC), 1.0 eq) (5) in CH$_2$Cl$_2$ (2.0 L (2502 g) solution and 3800 mL dry CH$_2$Cl$_2$. The mixture was cooled to 0-5° C. and 841.7 g (802 mL, 14.01 mol, 4.0 eq) AcOH was added.
Keeping the temperature between 0-5° C., Solution "B" (1.0 eq (5) and 4.0 eq AcOH in CH$_2$Cl$_2$) was added to Mixture "A" (1.25 eq NaB(OAc)$_3$H in CH$_2$Cl$_2$) over 1.5 hours. The resulting brownish purple solution is stirred at 0-5° C. and monitored by HPLC. After 13 hours stirring at 0-5° C., the amount of the starting material was below 3 a %, the reaction was worked up. The pH of the mixture was ~4. The (6)&(6') reaction mixture (12.0 L) was removed from the reactor and kept under 10° C. The 20 L glass reactor was charged with 5.0 L sat. Na$_2$CO$_3$. Keeping the temperature below 15° C. (over 2 hours), 12.0 L solution of (6)&(6') reaction mixture was added to sat. Na$_2$CO$_3$ solution. Intensive gas and foam evolution were observed. After addition the pH was 7. For setting the pH to 7-8, further 400 mL sat. Na$_2$CO$_3$ solution was needed. After setting the pH, the mixture was stirred for 20 minutes. The composed two layers were separated, the aqueous phase was extracted with 1 L CH$_2$Cl$_2$. The combined organic layer (~10.5 L) was evaporated in vacuo (600 mbar) at 40° C. (Thermostat: 50° C., inner temperature 30-33° C.). Yield: 91% (834.8 g crude (6)&(6') in 4713 g solution in CH$_2$Cl$_2$). HPLC purity: 74 a % of (6) (dr 88/12).

Stage 4: Crystallization of hydrochloride salt (6·HCl)—(2S,5R)-methyl 5-(2-chlorophenyl)pyrrolidine-2-carboxylate hydrochloride Under inert atmosphere, 4.1 kg of CH$_2$Cl$_2$ solution (containing 1720 g (6)&(6')) was swap to 2-propanol. Treaction: 15-40° C., p: 100-600 mbar over 4 hours, giving 3822 mL solution. Next, a 20 L glass reactor was charged with 1950 mL IPA (cooled below 5° C.) and 850 mL (822 g, containing 287 g, 7.89 mol, 1.1 eq HCl) HCl in IPA solution. The mixture was cooled to 0-5° C. and to this mixture 3.822 kg (containing 1.719 kg, 7.17 mol, 1.0 eq (6)&(6')) in IPA was added over 1 hour. The resulting solution was heated up to reflux (72° C. over 1 hour), stirred here for 10 minutes and cooled back to 20-25° C. (over 2 hours), then 1.72 L iPrOAc was added. The mixture was cooled to −5° C. over 2.5 hours. The mixture was seeded at 60° C. and at 34° C. After overnight stirring at −5° C. sample was taken: approx. 10 mL mixture contained 220 mg precipitate, meaning overall 192 g salt. The reaction mixture (suspension) was let to be stirred at −10° C. another 20 hours, but the sample predicted only 271 g salt. To increase the yield, solvent was removed: 5160 mL solvent was removed at 30° C. in 50-100 mbar. To the residue 1750 mL (1 Vol) iPrOAc was added and the suspension was cooled to −10° C. and stirred for 17 hours. Sample predicted 900 g wet material. Filtration was performed on G3 glass filter, washing with 2×1 L IPA:iPrOAc=1:1, 2×0.5 L iPrOAc. Wet mass: 822 g dried at 20-30° C. in 200-300 mbar overnight. Yield: 21% (480 g) pinkish solid (6·HCl) after prolonged drying. HPLC purity: 96.1 a %, chiral HPLC: ee: 99.9%, dr: 96.3/3.5.
Recrystallization of (6·HCl): A 2 L glass flask with magnetic stirring was charged with 1500 mL IPA, which was heated to 67° C. At that temperature, 478.6 g (6·HCl) was added, the mixture was heated to reflux over 50 min. After reaching 80° C. (solution), the mixture was let to cool back to 20-25° C. over 80 minutes. The composed suspension was filtered, washed with 200 mL IPA and dried in vacuo at 30° C. Dried product: 398 g white solid (6·HCl). HPLC purity: 99.5 a % (dr: 99.5 a %). Chiral HPLC purity: 98.9 a % (dr: 98.9/1.1).

Example 3: Manufacturing of Hydrochloride Salt (6·HCl) in a 350 g Batch

Stage 4: Crystallization of hydrochloride salt (6·HCl)—(2S,5R)-methyl 5-(2-chlorophenyl)pyrrolidine-2-carboxylate hydrochloride Under inert atmosphere a solution of (6&6') (1174 g crude (6&6') in 3404 g CH$_2$Cl$_2$; HPLC: 64.9 a % (6)) was subjected to solvent swap from $CH_2Cl_2$ to iPrOAc by distillation at 40° C. in vacuo (200-400 mbar) to get 1378 g (containing 1174 g 6&6') solution (solvent iPrOAc). Next, a 5 L glass reactor with mechanical stirrer was charged with 996 g (904 mL, containing 199.2 g, 5.457 mol, 1.1 eq HCl) HCl in iPrOAc solution and 290 mL dry MeOH. The mixture was cooled to 0-5° C. and to this mixture 1378 g (containing 1174 g, 4.897 mol, 1.0 eq) crude (6&6') in iPrOAc was added over 1 hour. (Solvent ratio in the end: MeOH:iPrOAc=1:4). The resulting solution was seeded and became a suspension. This suspension was stirred at 0-5° C. overnight (18 hours), then filtered off. Filtration on G3 glass filter and washing with 3×470 mL cold MeOH:iPrOAc=1:4 afforded a wet mass of 458 g. Drying at 30° C. in 200-300 mbar for 2 hours provided 392.7 g white solid (6·HCl). HPLC purity: 96.0 a % (dr: 98.4/1.6). Chiral HPLC purity: 98.0 a % (dr: 98.4/1.6).

Recrystallization of (6·HCl): At 20-25° C. a 5 L glass flask with mechanical stirring was charged with 785 mL (2 Vol) MeOH:iPrOAc=1:4 mixture, then 392.7 g (6·HCl) was added, the mixture was heated to reflux over 30 min. After reaching 80° C. (solution), the mixture was stirred there for 10-15 mint, then cooled to 0° C. After stirring at 0° C. for 30 minutes the suspension was filtered, and washed with 2×225 mL cold MeOH:iPrOAc=1:4. Wet mass obtained: 398 g, which was dried in vacuo (200-300 mbar) at 30° C. overnight to afford 341.4 g white solid (6·HCl). HPLC purity: 97.8 a % (dr: 98.9/1.1). Chiral HPLC purity: 98.7 a % (dr: 98.8/1.2 a %).

Example 4: Synthesis of Methyl Ester (9)—Alternative Coupling Stage 5'

Stage 5': Synthesis of methyl ester (9): (2S,5R)-methyl 5-(2-chlorophenyl)-1-(2'-methoxy-[1,1'-biphenyl]-4-carbonyl)pyrrolidine-2-carboxylate Mixture "A": Under inert atmosphere, 4.34 g (15.71 mmol, 1.0 eq) (6·HCl) was suspended in 22 mL (5V) dry iPrOAc. To the suspension, 3.3 mL (23.57 mmol, 1.5 eq) TEA (water content: 0.05%) was added and the obtained white suspension (mixture "A") was stirred at room temperature for 1 hour.

Solution "B": In a 100 mL round-bottomed flask, under inert atmosphere 3.59 g (15.71 mmol, 1.0 eq) (8) was suspended in 22 mL (5V) dry iPrOAc. To the suspension 4.4 mL (31.42 mmol, 2.0 eq) TEA (water content: 0.05%) was added. To the obtained suspension, 20.00 g 50 wt % T3P/EtOAc solution (31.42 mmol, 2.0 eq, 10.00 g T3P) was added dropwise over 2 min, keeping the temperature between 20-25° C. during the addition. The obtained opalescent solution "B" was stirred for 1 hour at room temperature.

After 1 hour stirring, solution "B" was added to mixture "A" at room temperature, then stirred under nitrogen atmosphere overnight and monitored by HPLC. The reaction mixture was then quenched with 90 mL water, keeping the temperature below 20° C. After phase separation, the organic phase was washed with 80 mL water (pH=1-2) and 2×40 mL 5% $Na_2CO_3$ solution (pH=10).

To the obtained iPrOAc solution, 15 mL toluene was added, then it was concentrated in vacuo at 40° C. To the concentrate, 14 mL toluene was added, then concentrated again. After concentration to 12.0 g, the iPrOAc content of the obtained solution was: 1.5%. The obtained toluene solution of (9) was used further in stage 6 hydrolysis without isolation, considering 100% yield for the coupling reaction.

Example 5: Properties of Sodium Salt (1·Na)

5.1. Solubility in Water

Purpose. Under its acid form, compound (1) is poorly soluble in water. Solubility assays were conducted to determine if salts of compound (1) have improved properties with this regard.

Method. The solubility in water was studied as described hereafter. 150 mg of the studied materials of (1), (1·Na) and (1·K) were transferred to a glass vial and 1.0 mL of deionized water was added, vortex and ultrasonic treatment cycles were applied during 5 min. Then pH was checked and adjusted to pH=9.0-10.0 range by accurate addition of 2M aqueous solution of NaOH for (1) and (1·Na) or KOH for (1·K). Then several cycles of vortex and ultrasonic treatment were applied for 30 min. pH was adjusted to pH=7.2-7.6 range by careful addition of NaOH or KOH or HCl aqueous solutions. Vortex and ultrasonic treatment cycles and pH adjustments were repeated until pH stabilized at pH=7.2-7.6 range. Then the suspensions were centrifuged at 3000 rpm and supernatant was filtered thought membrane filter. The resulting filtrate was diluted in 1000 folds with DMSO and analyzed by HPLC against standard solution with known concentration. The data obtained are represented in the table below.

Results. Comparison of solubility data of sodium salt (1·Na) with free acid (1) and potassium salt (1·K):

|  | Native pH | Maximal solubility pH 7.4 (mg/mL) |
|---|---|---|
| Free acid (1) | 5 | >64 |
| Sodium salt (1•Na) | 7 | 129 |
| Potassium salt (1•K) | 7 | 87 |

Aqueous solubility of (1·Na) was confirmed to be ~130 mg/mL.

Above results show a surprising increased aqueous solubility of sodium salt (1·Na) in comparison with the free acid (1) and the potassium salt (1·K). Especially, the solubility of the sodium salt (1·Na) is increased by 2 fold, compared with the free acid (1), and by 1.5 fold compared with the potassium salt (1·K). The improvement of the aqueous solubility is advantageous to improve dissolution rate and bioavailability, and especially important for formulation in water at high concentrations, like formulations used for maximum tolerated dose study for animals.

5.2. Stability

Purpose. Forced degradation studies were conducted to determine the respective stability of the acid form (1) and sodium salt (1·Na).

Method

For photolytic stability, cool daylight lamp OSRAM DULUX TWIST 23W 1600 lm 6500 K located in 20 cm distance from the studied samples was used. Samples were prepared at 1 mg/mL concentration in ACN/water (3:7 v/v) solution and exposed to light in capped glass vials placed on reflective surface at ambient temperature (around 22° C.).

For thermal stability powders were exposed to elevated temperature in capped glass vials kept inside thermostatic oven at 115° C.

Samples were analyzed by RP-HPLC and Chiral HPLC at T0, after 1 week and after 3 weeks. For RP-HPLC analysis samples were analyzed directly from solutions used for stability study. For Chiral HPLC, aliquots were evaporated in Genevac at 40° C. and re-dissolved in the mobile phase.

Results

| Conditions | Timing | Na salt (1•Na) purity (%) | Acid (1) purity (%) |
|---|---|---|---|
| Initial purities | T0 | 99.3 | 99.3 |
| Photolytic stability (solutions: 1 mg/mL in ACN/water (3:7)) | 1 week | 98.5 | 96.7 |
|  | 3 weeks | 97.0 | 75.9 |
| Thermal stability 115° C. (solids) | 1 week | 99.1 | 88.5 |
|  | 3 weeks | 98.9 | 71.4 |

The sodium salt (1·Na) presented much better photolytic and thermal stabilities after 3 weeks, compared to the free acid (1). Especially, in the photolytic stability assay, after 3 weeks, the acid form (1) see its purity to be decreased by 23.6%, while the purity of the sodium salt (1·Na) is decreased by only 2.3%. In the thermal stability assay, after 3 weeks, the acid form (1) see its purity to be decreased by 28.1%, while the purity of the sodium salt (1·Na) is decreased by only 0.4%.

The invention claimed is:

1. A process for the manufacturing of (2S,5R)-methyl 5-(2-chlorophenyl)pyrrolidine-2-carboxylate hydrochloride (6·HCl):

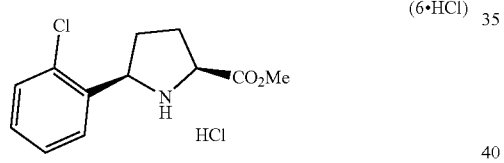

(6·HCl)

comprising a step of hydrochloride salt formation and epimer separation, consisting in crystallizing a mixture of epimers (6) and (6'):

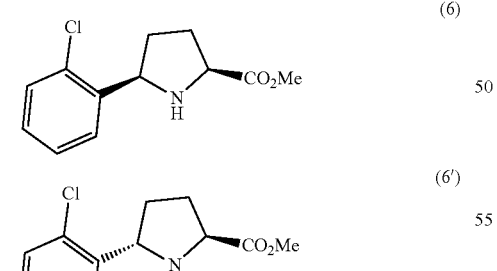

(6)

(6')

wherein the epimers ratio (6):(6') is at least 4:1,
in presence of hydrochloric acid, in a solvent selected from an alcohol solvent, isopropyl acetate, and mixtures thereof.

2. The process according to claim 1, further comprising a subsequent recrystallization step in a solvent selected from an alcohol solvent, isopropyl acetate, and mixtures thereof.

3. The process according to claim 1, wherein the alcohol solvent is selected from isopropyl alcohol, methanol, and mixtures thereof.

4. The process according to claim 1, wherein the mixture of epimers (6) and (6') in which the epimers ratio (6):(6') is at least 4:1, is obtained by reduction with sodium triacetoxyborohydride of compound (5):

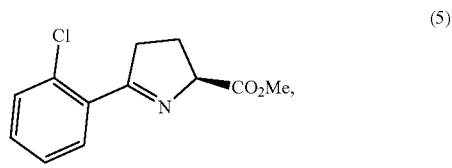 [SMILES: COC(=O)[C@@H]1CCC(c2ccccc2Cl)=N1]

(5)

in presence of an acid,
in a solvent selected from dichloromethane, acetonitrile, isopropyl acetate and mixtures thereof.

5. The process according to claim 4, wherein the solvent is dichloromethane.

6. The process according to claim 4, wherein the acid is selected from acetic acid and trifluoroacetic acid.

7. The process according to claim 4, wherein the acid is acetic acid.

8. The process according to claim 4, wherein compound (5) is obtained by:
a) performing a Knochel-Grignard reaction with compound (2) and compound (3):

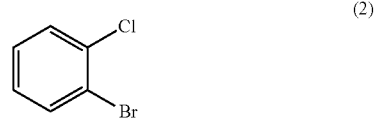

(2)

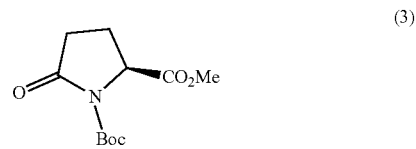

(3)

in presence of isopropyl magnesium chloride and lithium chloride, and quenched by the addition of an aqueous solution comprising an acid, leading to a mixture of compounds (4a) and (4b):

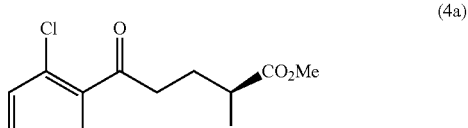

(4a)

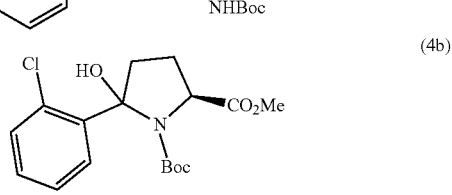

(4b)

and
b) contacting the mixture of compounds (4a) and (4b) obtained in step a) with an acid, in a solvent selected from dichloromethane, methanol, isopropyl alcohol, and mixtures thereof, at a temperature ranging from 0° C. to 25° C., leading to compound (5).

9. The process according to claim 8, wherein in step b), the acid the acid is trifluoroacetic acid or hydrochloric acid.

10. The process according to claim 8, wherein in step b), the solvent is dichloromethane.

11. A process for the manufacturing of (2S,5R)-5-(2-chlorophenyl)-1-(2'-methoxy-[1,1'-biphenyl]-4-carbonyl)pyrrolidine-2-carboxylic acid (1):

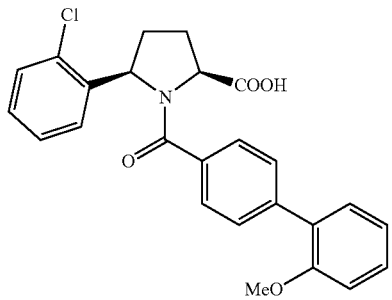

(1)

comprising:

a) the process according to claim 1, leading to compound (6·HCl);

b) forming methyl ester (9) from compound (6·HCl) obtained in step a),

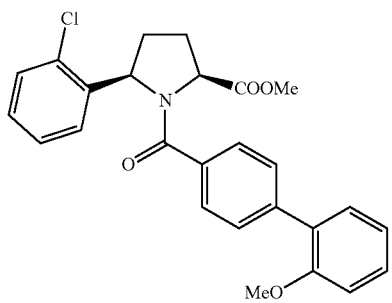

(9)

b1) by acylating compound (6·HCl) with compound (7):

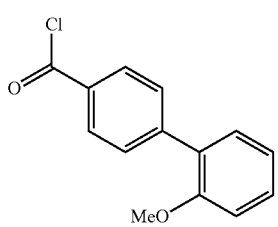

(7)

in presence of potassium carbonate, in a mixture of toluene and water as solvent, or b2) by coupling compound (6·HCl) with compound (8):

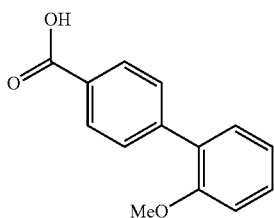

(8)

in presence of a base and an acid-activating agent; and c) saponifying methyl ester (9) in presence of sodium hydroxide and tetra-n-butylammonium bromide (TBAB) in a mixture of toluene and water as solvent, leading to amorphous acid compound (1).

12. A process for the manufacturing of sodium (2S,5R)-5-(2-chlorophenyl)-1-(2'-methoxy-[1,1'-biphenyl]-4-carbonyl)pyrrolidine-2-carboxylate (1·Na):

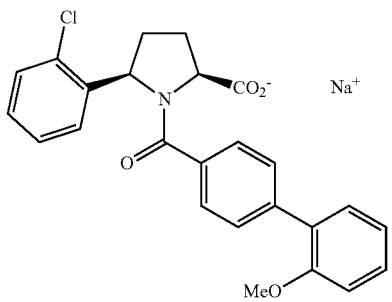

(1·Na)

comprising:

a) the process according to claim 11, leading to acid compound (1); and b) a step of sodium salt formation comprising contacting acid compound (1) obtained in step a) with sodium hydroxide in methanol as solvent, leading to amorphous sodium salt (1·Na).

13. The process according to claim 12, further comprising an optional step c) of precipitation in presence of isopropyl alcohol.

14. (2S,5R)-methyl 5-(2-chlorophenyl)pyrrolidine-2-carboxylate hydrochloride (6·HCl):

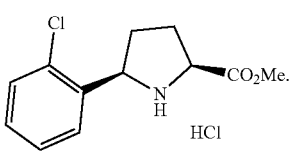

(6·HCl)

15. (2S)-1-tert-butyl 2-methyl 5-(2-chlorophenyl)-5-hydroxypyrrolidine-1,2-dicarboxylate (4b):
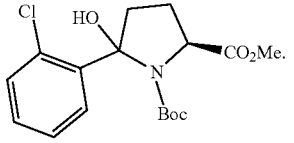
(4b)
* * * * *